(12) United States Patent
Terayama et al.

(10) Patent No.: US 8,719,533 B2
(45) Date of Patent: May 6, 2014

(54) STORAGE APPARATUS, COMPUTER SYSTEM, AND DATA MIGRATION METHOD

(75) Inventors: Atsumi Terayama, Kawasaki (JP); Akihisa Nagami, Yokohama (JP); Toru Tanaka, Sagamihara (JP); Yasunori Kaneda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 385 days.

(21) Appl. No.: 13/262,903

(22) PCT Filed: Sep. 20, 2011

(86) PCT No.: PCT/JP2011/005273
§ 371 (c)(1),
(2), (4) Date: Oct. 4, 2011

(87) PCT Pub. No.: WO2013/042159
PCT Pub. Date: Mar. 28, 2013

(65) Prior Publication Data
US 2013/0073825 A1    Mar. 21, 2013

(51) Int. Cl.
*G06F 12/00* (2006.01)
*G06F 12/02* (2006.01)
*G06F 12/08* (2006.01)
*G06F 3/06* (2006.01)

(52) U.S. Cl.
CPC ............... *G06F 12/02* (2013.01); *G06F 12/08* (2013.01); *G06F 3/0646* (2013.01); *G06F 3/0644* (2013.01); *G06F 3/0647* (2013.01)

USPC ............................ 711/165; 711/154; 711/209

(58) Field of Classification Search
CPC ....... G06F 12/02; G06F 12/08; G06F 3/0646; G06F 3/0644; G06F 3/0647
USPC ......................................... 711/154, 165, 209
See application file for complete search history.

(56) References Cited

U.S. PATENT DOCUMENTS

| 7,035,883 | B2 | 4/2006 | Kezuka et al. | |
|---|---|---|---|---|
| 7,228,380 | B2 | 6/2007 | Yamamoto et al. | |
| 2005/0138241 | A1 | 6/2005 | Fukuzawa et al. | |
| 2008/0120459 | A1* | 5/2008 | Kaneda et al. | 711/112 |
| 2011/0271073 | A1* | 11/2011 | Ikeda et al. | 711/170 |
| 2012/0117345 | A1* | 5/2012 | Kaneda et al. | 711/162 |
| 2012/0185426 | A1* | 7/2012 | Mori et al. | 707/609 |

FOREIGN PATENT DOCUMENTS

EP    2 026 191 A2    2/2009
JP    10-283272 A    10/1998

* cited by examiner

*Primary Examiner* — Reba I Elmore
(74) *Attorney, Agent, or Firm* — Volpe and Koenig, P.C.

(57) ABSTRACT

Provided is a method of using a dynamic chunk allocation function to efficiently carry out data volume migration. A storage apparatus according to the present invention includes first and second storage units and divides a storage extent in the second storage unit into chunks to add the chunks to a chunk pool to dynamically allocate the chunks in the chunk pool to a newly created logical data volume (see FIG. 3).

15 Claims, 22 Drawing Sheets

Fig. 4

| Data volume number | Capacity | Type | External flag | Migration target flag |
|---|---|---|---|---|
| 5001 | 160GB | DCAV | | |
| 2001 | 80GB | | Yes | |
| 0001 | 560GB | Pool Volume | | |
| 1001 | 560GB | Pool Volume | | |
| 3001 | 120GB | | | |
| ⋮ | ⋮ | ⋮ | ⋮ | ⋮ |

Fig. 6

| Volume chunk number (1661) | RAID group number (1662) | Physical drive number (1663) | LBA (1664) |
|---|---|---|---|
| 000 | 0 | 101-01 | 0 ~ 4095 |
| 001 | | 101-02 | 4096 ~ 8191 |
| | | 101-03 | |
| 002 | | 101-04 | 8192 ~ 12287 |
| ⋮ | ⋮ | ⋮ | ⋮ |
| Pool Volume Terminal Chunk | xxxxx | xxx-xx | xxxx ~ xxxx |

| Pool volume number (1671) | Performance (1672) |
|---|---|
| 0001 | Low |
| 1001 | High |
| 1002 | Medium |
| 2001 | Low |
| ⋮ | ⋮ |

| Pool chunk number | Pool volume number | Volume chunk number | Allocated | IO Rate [IO/hour] |
|---|---|---|---|---|
| 10000 | 0001 | 000 | Yes | 9920 |
| 10001 | | 001 | Yes | 2239 |
| 10002 | | 002 | | 0 |
| ⋮ | | ⋮ | ⋮ | ⋮ |
| xxxxx | | Pool Volume Terminal Chunk | xxxx | xxxx |
| 20000 | 1001 | 000 | | 0 |
| 20001 | | 001 | Yes | 1075 |
| 20002 | | 002 | | 0 |
| ⋮ | | ⋮ | ⋮ | ⋮ |
| xxxxx | | Pool Volume Teminal Chunk | xxxx | xxxx |
| ⋮ | ⋮ | ⋮ | ⋮ | ⋮ |

1651 1652 1653 1654 1655 — 165

Fig. 9
(a)
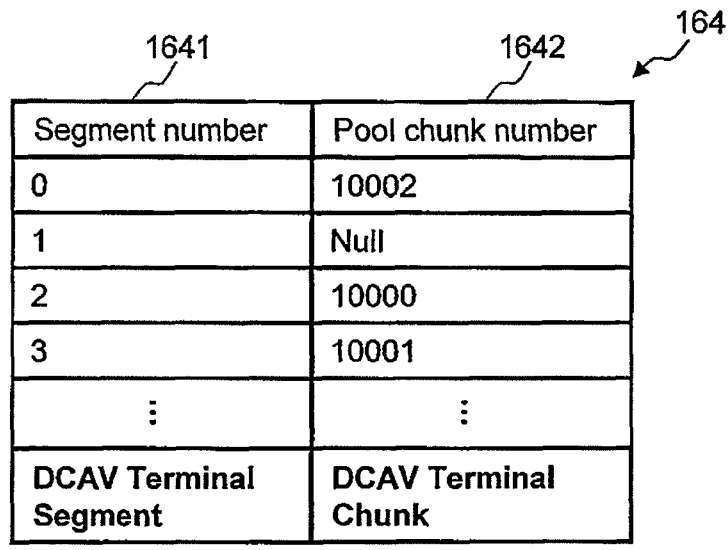
(b)
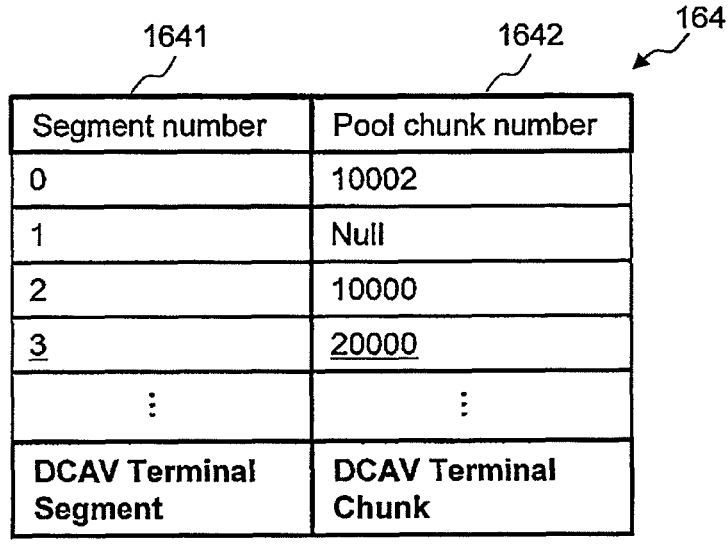

Fig. 11
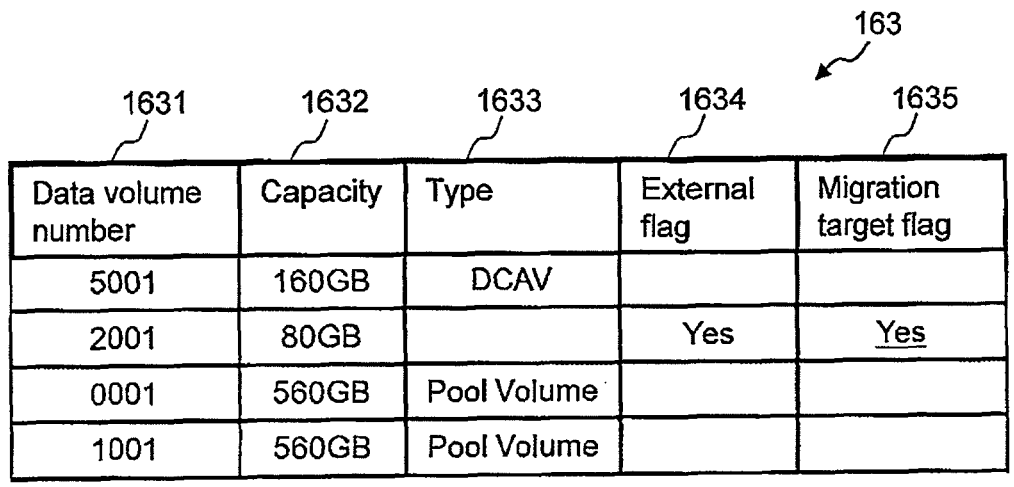
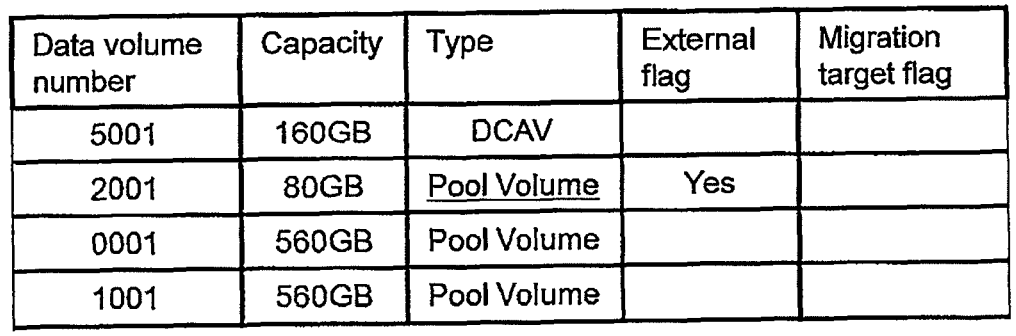
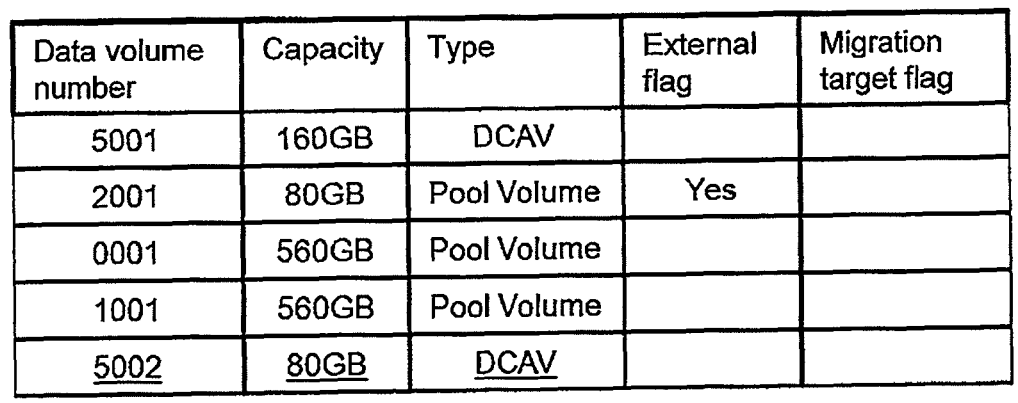

Fig. 17

| Pool chunk number | Pool volume number | Volume chunk number | Allocated | IO Rate [IO/hour] |
|---|---|---|---|---|
| 10000 | 0001 | 000 | Yes | 9920 |
| 10001 | | 001 | Yes | 2239 |
| ⋮ | | ⋮ | ⋮ | ⋮ |
| xxxxx | | Pool Volume Terminal Chunk | xxxx | xxxx |
| 20000 | 1001 | 000 | | 0 |
| 20001 | | 001 | Yes | 1075 |
| ⋮ | | ⋮ | ⋮ | ⋮ |
| xxxxx | | Pool Volume Terminal Chunk | xxxx | xxxx |
| 30000 | 2001 | 000 | Yes | |
| 30001 | | 001 | Yes | |
| ⋮ | | ⋮ | ⋮ | ⋮ |
| xxxxx | | Pool Volume Terminal Chunk | Yes | |
| ⋮ | ⋮ | ⋮ | ⋮ | ⋮ |

165
1651 1652 1653 1654 1655

Fig. 20
(a)
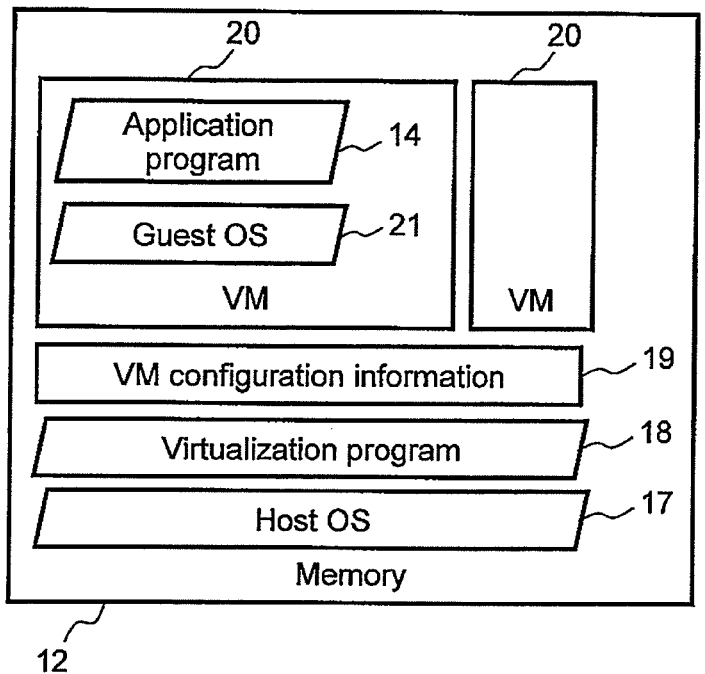
(b)
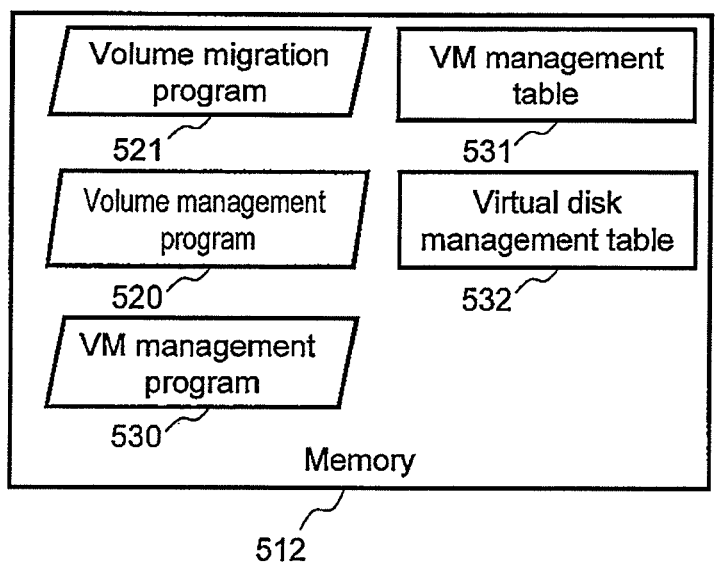

STORAGE APPARATUS, COMPUTER SYSTEM, AND DATA MIGRATION METHOD

TECHNICAL FIELD

The present invention relates to a storage apparatus.

BACKGROUND ART

Storage extents in a storage system are provided to a host computer as a logical set called data volumes. The host computer recognizes the data volumes as one logical device. Conventionally, the data volumes are created from one large set (for example, a RAID group) of physical storage devices (for example, magnetic hard disk drives). Therefore, storage extents with homogenous physical characteristics (I/O performance and cost) are allocated to the data volumes.

However, accesses to the data volumes may not be homogenous in all areas in the data volumes. For example, when a server virtualization technique is used to construct an information system, a plurality of virtual disks with significantly different access frequencies due to the roles or applications of the virtual machines may be stored in the same data volume.

As a result, data with low access frequency is continuously placed on an expensive data volume, or data with high access frequency is continuously placed on a low-speed data volume. Therefore, the cost performance of the entire storage system is reduced.

Patent Literature 1 described below discloses a technique for improving the cost performance of the storage system. In Patent Literature 1, a dynamic chunk allocation function is used in which the data volumes are divided into sets of data blocks called chunks, and the chunks constituted by physical data blocks with different performances and costs are dynamically allocated to the data volumes. For example, the cost performance of the storage apparatus can be optimized by allocating a high-speed, expensive chunk to a storage extent with high access frequency to the data volume and allocating a low-speed, inexpensive chunk to a storage extent with low access frequency.

The storage system of this type includes dynamic chunk allocation volumes (DCAVs) in which physical blocks that record data of the data volumes are dynamically changed. The dynamic chunk allocation function is realized by the following two processes.

A first process is carried out when a write command is received from a host for a segment that is not allocated with a physical block in the DCAV. In the present process, if a chunk is not yet allocated to the segment designated by the write command, a chunk constituted by physical blocks is allocated to the segment.

A second process is a process of changing the physical blocks for arranging the data chunk-by-chunk according to a write command frequency and a read command frequency received by the data volumes or according to a policy set by management software. As a result of the second process, data recorded in the volumes can be migrated from a physical storage device to another physical storage device with different characteristics chunk-by-chunk without changing the logical configuration of the data volumes as seen from the host computer. The data migration can change the data volumes to a physical configuration with a higher cost performance in accordance with the use frequency. The data on an old physical storage device can be migrated to a new physical storage.

The performance and the number of chunks allocated to the data volumes are determined depending on the accesses from the host computer, and the performance and the number cannot be deterministically predicted. Therefore, pools (chunk pools) for storing the chunks in advance are necessary. An example of creating the chunk pools includes a method of using a set of data volumes (pool volumes) managed by dividing the data volumes into chunks.

Meanwhile, Patent Literature 2 describes an external storage connection function in which data volumes in another storage apparatus are virtualized as if such data volumes belong to the storage apparatus, thereby providing access to the host computer. As a result of the function, for example, introducing a new storage apparatus with the external storage connection function in an existing storage system allows using a function provided by the new storage apparatus without carrying out a configuration change or a data rearrangement of the existing storage apparatus.

Patent Literature 3 described below describes a technique of reducing the load related to a process for an external device in a storage system with the external storage connection function.

CITATION LIST

Patent Literature

PTL 1: U.S. Pat. No. 7,035,883.
PTL 2: JP Patent Publication (Kokai) No. 10-283272A (1998).
PTL 3: U.S. Pat. No. 7,228,380.

SUMMARY OF INVENTION

Technical Problem

The dynamic chunk allocation function has an effect of migrating data on a physical storage device to another physical storage device, and the function can be used to migrate data volumes. However, DCAVs have specific logical structures for managing physical storage extents. Therefore, to use the dynamic chunk allocation function for data volumes that are not DCAVs, the contents stored in the data volumes need to be copied to a separately created DCAV.

Therefore, to migrate a data volume between storage apparatuses for a replacement or system reconstruction of a storage apparatus in a conventional technique such as Patent Literature 3, a migration target data volume on a second storage apparatus needs to be recognized by the external storage connecting function included in the first storage apparatus, and then all contents of the migration target data volume needs to be copied to the DCAV in the first storage apparatus. The data can be rearranged by the dynamic chunk allocation function after copying all migration target data volume.

In the conventional system, all data are copied without considering the access frequency in the migration target volume, and the storage capacity and the migration time are consumed even for data with less necessity for storage. In addition, the dynamic chunk allocation function does not effectively work until the completion of the copy of the data volume, and a long time is required for the change to a data arrangement with a good cost performance after the completion of the copy.

The present invention has been made to solve the problem, and an object of the present invention is to provide a method of using a dynamic chunk allocation function to efficiently carry out a data volume migration.

Solution to Problem

A storage apparatus according to the present invention includes first and second storage units, and after dividing a storage extent in the second storage unit into chunks and adding the chunks to a chunk pool, the chunks in the chunk pool are dynamically allocated to a newly created logical data volume.

Advantageous Effects of Invention

According to the storage apparatus of the present invention, data can be migrated chunk-by-chunk by dividing a storage extent in the second storage unit into chunks and dynamically allocating the chunks. As a result, data volumes can be efficiently migrated between storage apparatuses by reducing the consumed storage capacity, amount of communication, required time, and the like.

BRIEF DESCRIPTION OF DRAWINGS

FIG. 4 is a diagram showing an example of configuration of a data volume list table 163.

FIG. 6 is a diagram showing an example of configuration of a pool volume management table 166.

FIG. 7 is a diagram showing an example of configuration of a pool volume list table 167.

FIG. 8 is a diagram showing an example of configuration of a chunk pool management table 165.

FIGS. 9(a) and 9(b) are diagrams showing examples of configuration of a DCAV management table 164.

FIG. 11 is a diagram showing a change in a record in the data volume list table 163 based on the processing flow shown in FIG. 10.

FIG. 17 is a diagram showing a change of a record in the chunk pool management table 165 based on the processing flow of FIG. 13 or 15.

FIGS. 20(a) and 20(b) are diagrams showing data and the like stored in a memory 12 on a host computer 10 and a memory 512 on a management computer 500 according to a third embodiment.

DESCRIPTION OF EMBODIMENTS

First Embodiment

In a first embodiment of the present invention, a volume migration function will be described in which a data volume is divided into a plurality of chunks (logical aggregation of data blocks), and data is migrated from a physical storage device to another physical storage device chunk-by-chunk.

Hereinafter, a configuration and a logical structure of a computer system will be described first, and then the dynamic chunk allocation function and the external storage connection function realized by known techniques will be described. A process flow for carrying out the volume migration using the functions will then be described.

The "dynamic chunk allocation function", the "external storage connection function", and the "volume migration function" are convenient names for describing the present first embodiment in detail. Therefore, the functions indicated by the terms are not limited to the embodiments illustrated herein, and it should be noted that the functions can be expanded to other embodiments those skilled in the art already know or will know.

<A. System Configuration and Logical Structure>

Figure 1:
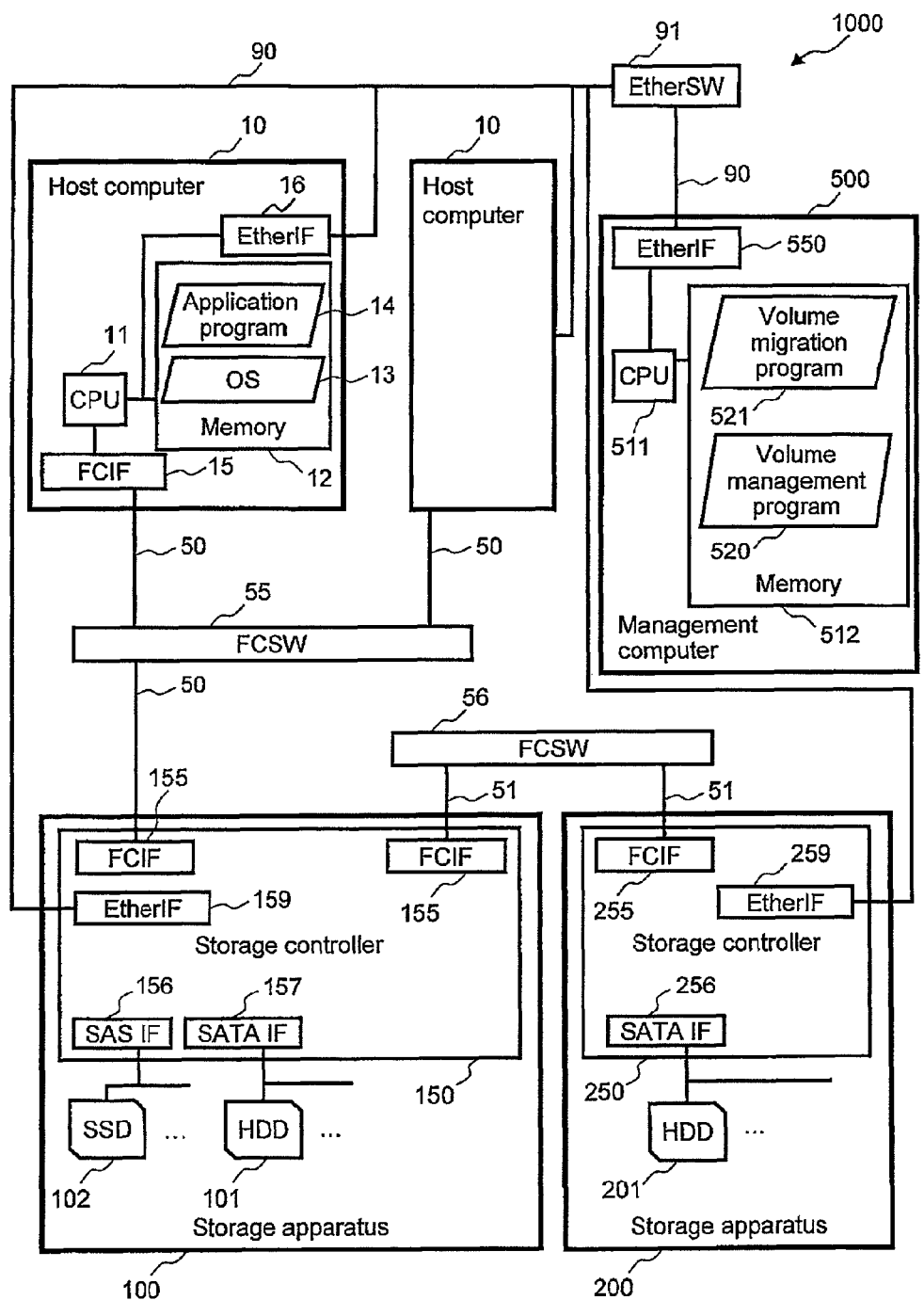
FIG. 1 is a diagram showing a hardware configuration of a computer system 1000 according to a first embodiment.

FIG. 1 is a diagram showing a hardware configuration of a computer system 1000 according to the present first embodiment. The computer system 1000 includes a host computer 10, a first storage apparatus 100, a second storage apparatus 200, a management computer 500, a data network 50, and a management network 90.

Although software, such as an OS (Operating System) and a program, will be occasionally described as an operational entity for the convenience of the description, it should be remarked that an arithmetic unit, such as a CPU (Central Processing Unit) actually executes the software.

The host computer 10 is a computer that uses a storage extent provided by the first storage apparatus 100. The host computer 10 is connected to the storage apparatus 100 via the data network 50.

The host computer 10 includes a CPU 11 and a memory 12. The memory 12 stores an OS 13 and an application program 14. The CPU 11 reads out the software from the first storage apparatus 100 and temporarily stores the software in the memory 12 to execute the software. The OS 13 is an OS of the host computer 10. The application program 14 is software executed on the OS 13, and the application program 14 accesses the storage extent provided by the first storage apparatus 100 to carry out a predetermined process.

Files and data of the OS 13 and the application program 14 are stored in data volumes provided by the storage apparatus 100. The OS 13 and the application 14 issue a write command or a read command to the storage apparatus 100. The host computer 10 is connected to the management computer 500 via the management network 90.

For example, a fibre channel can be used as the data network 50. Another network, such as an ethernet (registered trademark) and infiniBand, can also be used. A fibre channel switch (FCSW) 55 is a switch that connects the host computer 10 and the storage apparatus 100 via the data network 50. The host computer 10 and the first storage apparatus 100 include fibre channel interface boards (FCIF) 15 and 155, respectively, for the connection to the fibre channel data network 50.

The host computer 10, the first storage apparatus 100, and the second storage apparatus 200 are connected to the management computer 500 via the management network 90. For example, an ethernet can be used as the management network 90. Other networks may also be used. The host computer 10, the first storage apparatus 100, the second storage apparatus 200, and the management computer 500 include ethernet interface boards (EtherIF) 16, 159, 259, and 550, respectively, for connection to the management network 90.

The management computer 500 is a computer that manages the operations of the first storage apparatus 100 and the second storage apparatus 200. The management computer 500 includes a CPU 511 and a memory 512. The memory 512 stores a volume management program 520 and a volume migration program 521. The CPU 511 executes the programs stored in the memory 512.

The volume management program 520 is a program for issuing an operation request to a data volume in the first storage apparatus 100. The volume migration program 521 is a program for instructing migration of data in a data volume on the first storage apparatus 100. Detailed operations of the programs will be described later.

The first storage apparatus 100 includes a storage controller 150 and a plurality of types of storage media with different performances. Although an HDD (Hard Disk Drive) 101 and an SSD (Solid State Drive) 102 are illustrated here, the media are not limited to these. The storage apparatus 100 provides one or more data volumes (logical storage areas created from physical storage areas) to the host computer 10.

The second storage apparatus 200 includes a storage controller 250 and an HDD 201. In addition to the HDD 201, other physical storage devices with different characteristics, such as an SSD, may be included as in the first storage 100. Like the first storage apparatus 100, the second storage apparatus 200 provides one or more data volumes.

The first storage apparatus 100 and the second storage apparatus 200 are connected via a data network 51. A fibre channel and other networks can be used as the data network 51. An FCSW 56 is a switch for connecting the first storage apparatus 100 and the second storage apparatus 200 via the data network 51. The first storage apparatus 100 and the second storage apparatus 200 include FCIFs 155 and 255, respectively, for connection with fibre channel data network 51. Although the data network 50 and the data network 51 are physically different networks in the present first embodiment, physically the same network apparatus (for example, FCSW) may be used to form the networks as long as the data network 50 and the data network 51 can be logically separated.

Figure 2:
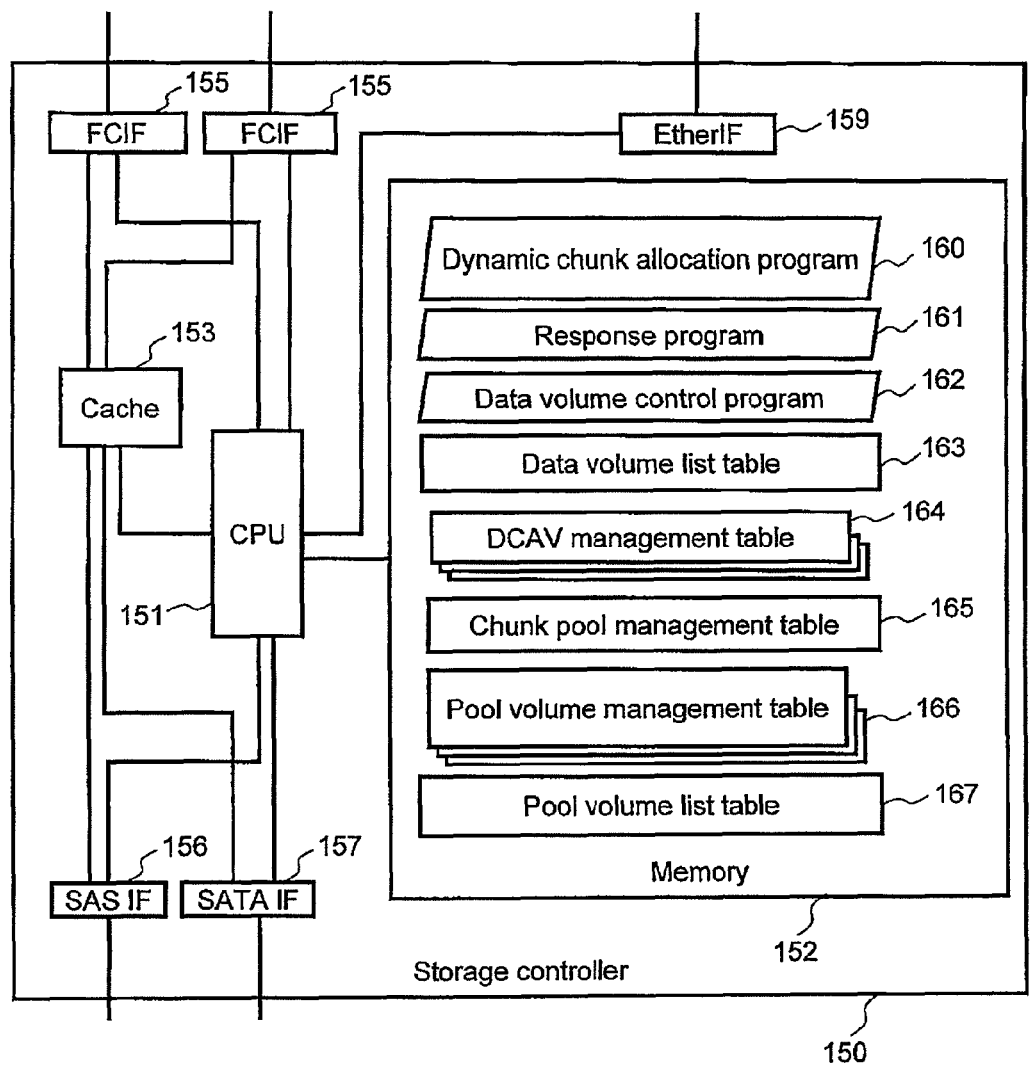
FIG. 2 is a diagram showing an internal configuration of a storage controller 150.

FIG. 2 is a diagram showing an internal configuration of the storage controller 150. The storage controller 150 includes a CPU 151, a memory 152, a cache 153, an FCIF 155, a SAS (Serial Attached SCSI) IF 156, a SATA (Serial ATA) IF 157, and an Ether IF 159.

The CPU 151 executes programs stored in the memory 152. The memory 152 will be described later. The cache 153 temporarily stores data received from the host computer 10 and the second storage apparatus 200 or data read out from the HDD 101 and the SSD 102. The SAS IF 156 and the SATA IF 157 are interfaces for connection to the HDD 101 and the SSD 102, respectively. The interfaces are not limited to the SAS and the SATA as long as the interfaces are compliant with the specifications of the connected HDD 101 or SSD 102.

The memory 152 stores a dynamic chunk allocation program 160, a response program 161, a data volume control program 162, a data volume list table 163, a DCAV management table 164, a chunk pool management table 165, a pool volume management table 166, and a pool volume list table 167.

The dynamic chunk allocation program 160 includes a dynamic chunk allocation function. The response program 161 responds to READ CAPACITY/READ/WRITE commands from the host computer 10. The data volume control program 162 generates data volumes (including DCAVs and pool volumes) and allocates the data volumes to the host computer 10. Configurations of the tables will be described later.

The second storage apparatus 200 has the same hardware configuration as the first storage apparatus 100. However, a memory in the storage controller 250 only stores a response program for responding to READ CAPACITY/READ/WRITE commands relayed by the first storage apparatus 100, a data volume control program for generating and managing data volumes (not including DCAVs and pool volumes), and a data volume list table for managing attributes of the data volumes in the second storage apparatus 200.

Figure 3:
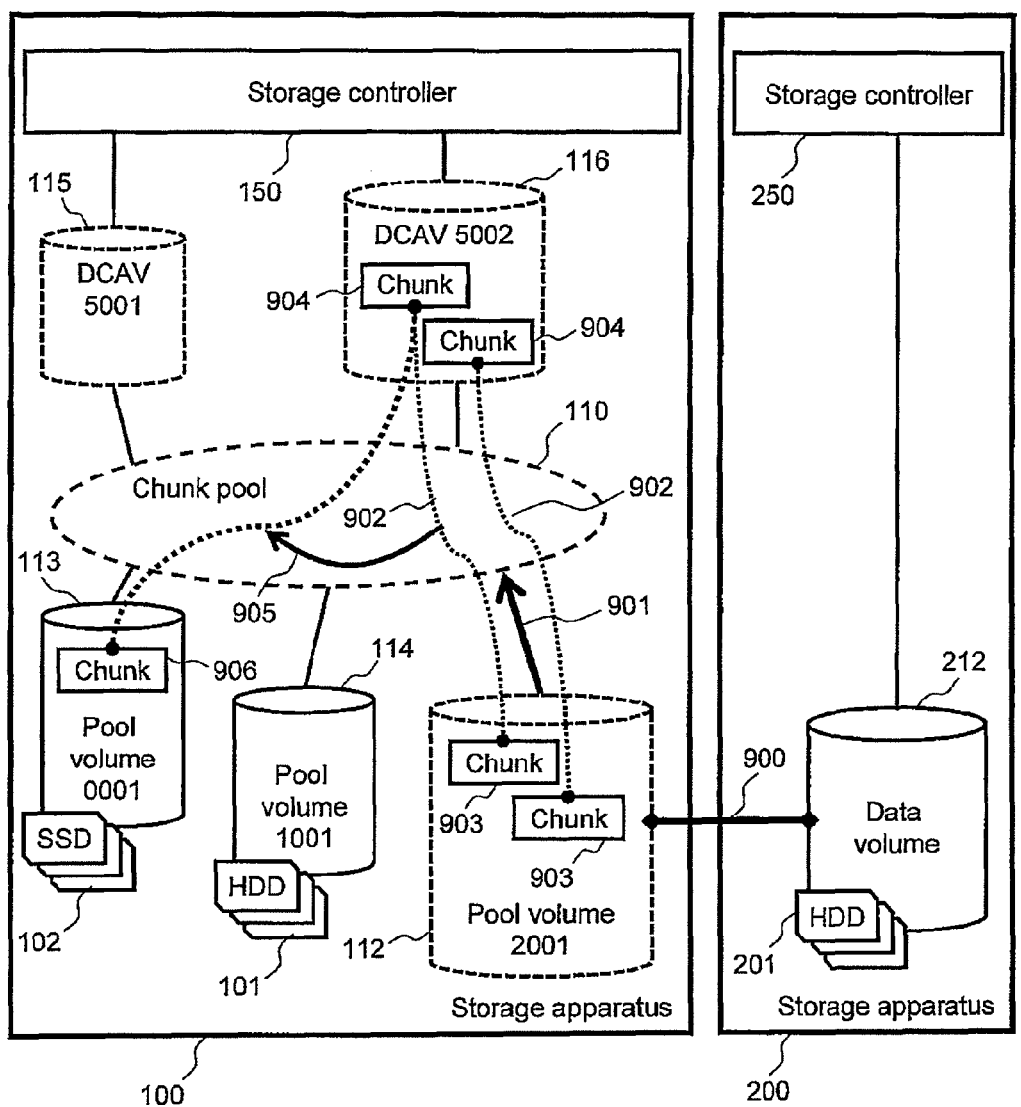
FIG. 3 is a diagram showing a logical configuration of a storage extent in a first storage apparatus 100.

FIG. 3 is a diagram showing a logical configuration of a storage extent in the first storage apparatus 100. The first storage apparatus 100 includes data volumes 112, 113, 114, 115, and 116 managed by the storage controller 150. The data volumes herein denote storage extents logically managed as one unit.

In the present first embodiment, the data volumes are classified into three types of volumes, DCAVs for which the dynamic chunk allocation function can be used, pool volumes constituting chunk pools, and other data volumes. The data volume list table 163 manages the types of the data volumes.

In the present first embodiment, the first storage apparatus 100 uses the external storage connection function to cause the storage controller 150 to recognize an external volume 212 provided by the second storage apparatus 200 as the data volume 112 in the first storage apparatus 100 via an external connection 900.

The storage controller 150 uses the volume migration function to add the data volume 112 to the chunk pool 110 and creates the DCAV 116 in which all chunks in the data volume 112 (becomes the pool volume 112 after the addition to the chunk pool 110) are allocated. The storage controller 150 further controls the dynamic chunk allocation function based on the volume migration function and carries out, for example, a process 905 of changing the chunk allocation destination in the DCAV 116 from chunks 903 to chunks 906. This can migrate the data held in the external volume 212 on the second storage apparatus 200 to a data volume (pool volume 113 herein) on the first storage apparatus 100 chunk-by-chunk.

In order to prevent new data from being written into the migration-source data volume during migration, it is desirable not to allocate the chunk 903 to other DCAVs before completing the migration of the data stored in all of the chunk 903 in the data volume 112 into other pool volumes included in the first storage apparatus (e.g. the pool volume 113). The process will be described in detail later.

FIG. 4 is a diagram showing an example of configuration of the data volume list table 163. The data volume control program 162 operates the data volume list table 163 (creates lines/deletes lines/changes values). The data volume list table 163 includes a data volume number field 1631, a capacity field 1632, a type field 1633, an external flag field 1634, and a migration target flag field 1635.

The data volume number field 1631 holds numbers for uniquely identifying the data volumes. The capacity field 1632 holds capacity values of the data volumes identified by the data volume number field 1631. The type field 1633 holds values indicating types of the data volumes identified by the data volume number field 1631. The external flag field 1634 holds flags indicating whether the data volumes identified by the data volume number field 1631 are external volumes (described later) on the second storage apparatus 200. The migration target flag field 1635 holds flags indicating whether the data volumes identified by the data volume number field 1631 are migration targets.

Like the first storage apparatus 100, the second storage apparatus 200 includes the data volume control program and the data volume list table. However, it is only necessary that the data volume list table hold at least the data volume numbers and the volume capacities and that the data volume control program can manage at least the data volume numbers and the volume capacities.

<B. Dynamic Chunk Allocation Function>

The dynamic chunk allocation function is a function of dynamically allocating chunks with different performances and costs to data volumes in a storage system that can manage the storage extent based on a set of data blocks called chunks. In the present first embodiment, the dynamic chunk allocation program 160 has the function and creates a special data volume called a dynamic chunk allocation volume (DCAV).

Figure 5:
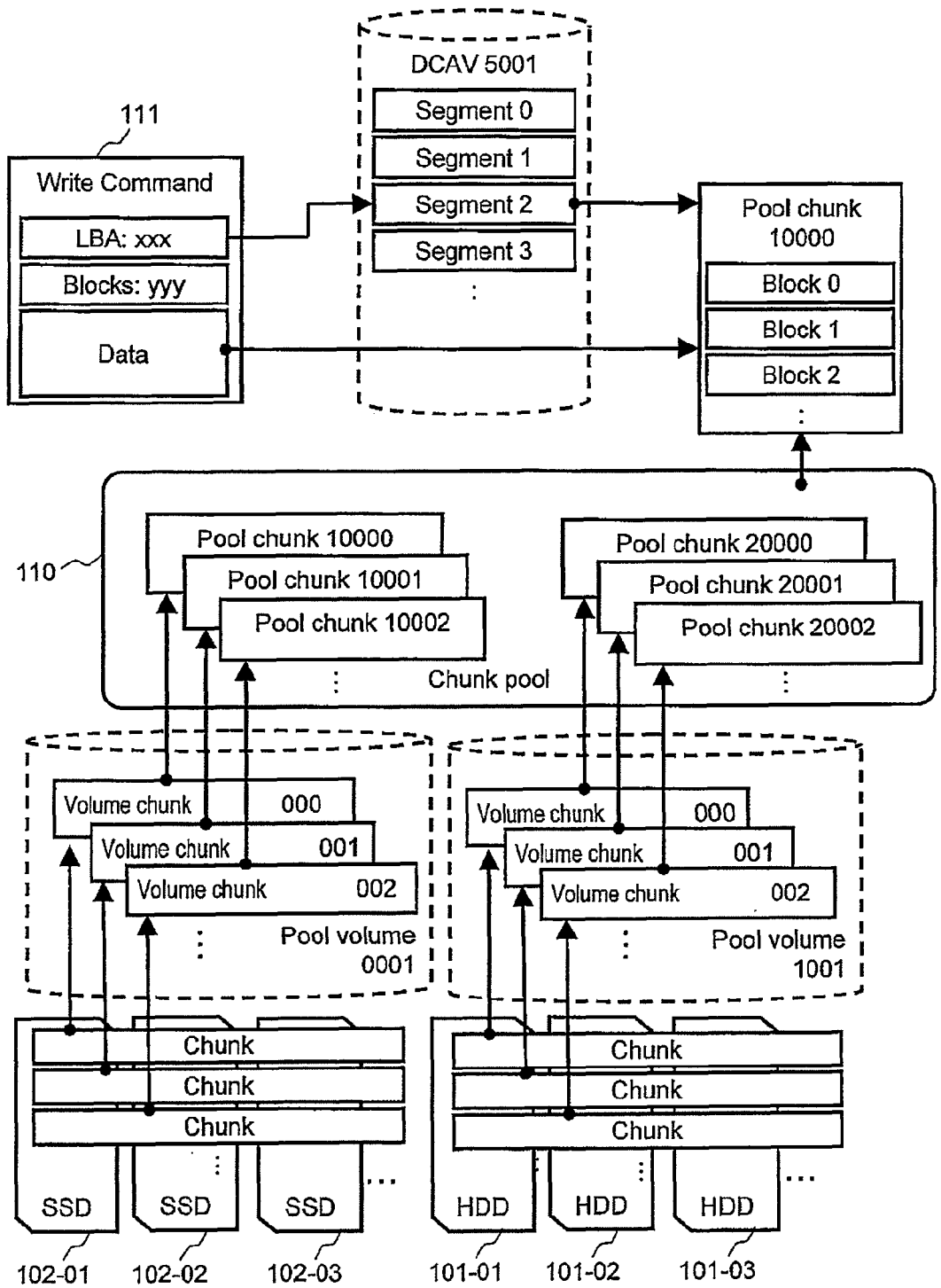
FIG. 5 is a diagram explaining logical structures for realizing a dynamic chunk allocation function.

FIG. 5 is a diagram explaining logical structures for realizing the dynamic chunk allocation function. The dynamic chunk allocation function is realized by three logical structures described below.

(FIG. 5: Pool Volumes)

A first logical structure includes pool volumes for managing a storage extent of the HDD 102 or the SSD 102, which is a physical storage device, as a logical aggregation (chunks). The storage controller 150 recognizes the pool volumes as data volumes.

The pool volumes are generated by the data volume control program 162. The data volumes with "Pool Volume" in the type field 1633 of the data volume list table 163 are pool volumes.

The chunks in the pool volumes are managed on the pool volume management table 166 managed by the dynamic chunk allocation program 160, and unique volume chunk numbers are provided (see FIG. 6 described later).

Unique pool volume numbers are provided to the pool volumes. The pool volumes are constituted by specific physical storage devices, and the cost effectiveness varies depending on the characteristics (such as random I/O performance, sequential I/O performance, and facility cost) attributed to the physical storage devices. Therefore, the dynamic chunk allocation program 160 manages the performances of the pool volumes on the pool volume list table 167 (see FIG. 7 described later).

(FIG. 5: Chunk Pool)

A second logical structure includes the chunk pool 110 for storing chunks included in one or more pool volumes. The chunks in the chunk pools 110 are managed by providing pool chunk numbers on the chunk pool management table 165 operated by the dynamic chunk allocation program 160 (see FIG. 8 described later). All chunks in the chunk pool 110 are associated with specific chunks of specific pool volumes.

(FIG. 5: Dynamic Chunk Allocation Volume (DCAV))

A third logical structure is a dynamic chunk allocation volume (DCAV) that is allocated with chunks from the chunk pool 110 and that is recognized as a data volume from the storage controller 150. The DCAV is generated by the data volume control program 162. The data volume with "DCAV" in the type field 1633 of the data volume list table 163 is the DCAV.

The segments in DCAV are managed on the DCAV management table 164 operated by the dynamic chunk allocation program 160 (see FIG. 9 described later). The chunks are a set of data blocks in the HDD 101 or the SSD 102. The DCAV is divided into a plurality of segments as in the other data volumes. In the present first embodiment, the sizes of the chunks and the sizes of the segments are the same.

FIG. 6 is a diagram showing an example of configuration of the pool volume management table 166. The pool volume management table 166 is a table for managing the chunks in the pool volumes and includes a volume chunk number field 1661, a RAID group number field 1662, a physical drive number field 1663, and an LBA field 1664.

The volume chunk number field 1661 holds identification numbers of the chunks in the pool volumes. The RAID group number field 1662 holds identification numbers of RAID groups to which the chunks identified by the volume chunk number field 1661 belong. The physical drive number field 1663 holds identification numbers of the physical storage devices to which the chunks identified by the volume chunk number field 1661 belong. The LBA field 1664 indicates ranges of logical addresses on the physical storage devices occupied by the chunks identified by the volume chunk number field 1661.

FIG. 7 is a diagram showing an example of configuration of the pool volume list table 167. The pool volume list table 167 is a table for managing the pool volumes and performance values of the pool volumes and includes a pool volume number field 1671 and a performance field 1672. The pool volume number field 1671 holds identification numbers of the pool volumes. The performance field 1672 holds performance values of the pool volumes identified by the pool volume number field 1671. Although simplified performance indices are illustrated herein, more detailed performance index values may be held.

FIG. 8 is a diagram showing an example of configuration of the chunk pool management table 165. The chunk pool management table 165 is a table for managing the chunks in the chunk pool 110 and includes a pool chunk number field 1651, a pool volume number field 1652, a volume chunk number field 1653, an allocated flag field 1654, and an I/O frequency field 1655.

The pool chunk number field 1651 holds identification numbers of the chunks in the chunk pool 110. The pool volume number field 1652 is a field for holding the identification numbers of the pool volumes to which the chunks identified by the pool chunk number field 1651 belong and corresponds to the pool volume number field 1671. The volume chunk number field 1653 includes identification numbers for identifying the chunks identified by the pool chunk number field 1651 in the pool volumes and corresponds to the volume chunk number field 1661. The allocated flag field 1654 holds flags indicating whether the chunks identified by the pool chunk number field 1651 are allocated to the pool volumes. The I/O frequency field 1655 holds I/O frequency values of the chunks identified by the pool chunk number field 1651.

FIGS. 9(a) and 9(b) are diagrams showing examples of configuration of the DCAV management table 164. The DCAV management table 164 is a table for managing the segments in the DCAV and includes a segment number field 1641 and a pool chunk number field 1642. The segment number field 1641 holds numbers for identifying the segment numbers in the DCAV. The pool chunk number field 1642 is a field for holding the identification numbers of the chunks in the chunk pool 110 as entities of the segments identified by the segment number field 1641 and corresponds to the pool chunk number field 1651.

FIGS. 9(*a*) and 9(*b*) respectively show states of the DCAV management table 164 before and after changing the allocation destinations of the chunks in the chunk pool 110. A process of changing the allocation destinations of the chunks will be described later.

FIG. 5 shows a relationship between a write command 111, the DCAV, the chunk pool 110, the pool volumes, the chunks, and the HDD 101 or the SSD 102. Hereinafter, a process carried out by the storage controller 150 by the write command 111 shown in FIG. 5 based on the table configurations described in FIGS. 6 to 9 will be described.

Data blocks designated by the write command 111 are converted through the management tables and associated with data blocks on the physical storage device. For example, when the storage controller 150 receives the write command 111 for the DCAV, the response program 161 refers to the DCAV management table 164 and acquires a value of the pool chunk number field 1642 corresponding to the segment number field 1641 designated by the command 111. If the acquired pool chunk number is not Null, the response program 161 refers to the chunk pool management table 165 to acquire the pool chunk number field 1651 with the same value as the acquired pool chunk number as well as the pool volume number 1652 and the volume chunk number 1653 corresponding to the pool chunk number field 1651. The response program 161 further searches a record corresponding to the volume chunk number 1653 from the pool volume management table 166 and writes data in the corresponding data block.

For a read command, the response program 161 also specifies a data block to be read in a similar procedure. The frequencies of the execution of the read commands and the write commands by the response program 161 are recorded in the I/O frequency field 1655 of the chunk pool management table 165.

The dynamic chunk allocation function is realized by the following two processes provided by the dynamic chunk allocation program 160.

A first process is a process of allocating chunks to unused segments of the DCAV. When the DCAV is first created, records that can secure all segments equivalent to the values of the capacity field 1632 of the data volume list table 163 are created on the DCAV management table 164. As a result, the segments equivalent to the capacity of the DCAV are secured. However, at this point, chunks and data blocks that are physical storage extents are not allocated to the segments, and the pool chunk number field 1642 is set to Null. The chunks are allocated for the first time when the segments are actually used later, and the pool chunk number corresponding to the pool chunk number field 1651 is set.

For example, when the response program 161 attempts to access a segment 1 of a DCAV 5001 shown in FIG. 5, the pool chunk number field 1642 corresponding to the segment number field 1641=1 indicates Null according to the DCAV management table 164 shown in FIG. 9, and it can be recognized that the chunk is not allocated to the segment.

In this case, the dynamic chunk allocation program 160 first refers to the type field 1633 and the migration target flag field 1635 of the data volume list table 163 to specify a pool volume that is not a migration target. The dynamic chunk allocation program 160 then refers to the allocated field 1654 of the pool volume in the chunk pool management table 165 to specify a pool chunk that is not allocated to any DCAV (not "Yes" in the allocated flag field 1654). The dynamic chunk allocation program 160 sets the value of the specified pool chunk number field 1651 to the pool chunk number field 1642 of the DCAV management table 164. As a result, the chunk is allocated to the segment 1 of the DCAV 5001.

According to the first process, only the physical storage extent necessary for the data volumes to store data is secured, and the storage capacity provided by the first storage apparatus 100 can be efficiently used.

A second process is a process of changing the chunks allocated to the segments of the DCAV. The volume management program 520 on the management computer 500 can designate the performances of the chunks allocated to the segments of the DCAV for the dynamic chunk allocation program 160.

The dynamic chunk allocation program 160 refers to the DCAV management table 164 and the chunk pool management table 165 to acquire the pool volume number field 1652 allocated to the segments in the DCAV. The dynamic chunk allocation program 160 refers to the pool volume list table 167 to acquire the performances of the chunks allocated to the segments in the DCAV based on the performance field 1672 corresponding to the pool volume number field 1652.

If the designated performances and the performances of the currently allocated chunks are different, the dynamic chunk allocation program 160 specifies the chunks in the pool volume with the designated performances and migrates the currently allocated chunks to correct the part of the DCAV management table 164 and the chunk pool management table 165 to change the allocation destination chunks.

For example, a case in which a segment 3 shown in FIG. 9(*a*) requires a high performance "High" will be illustrated. The pool chunk number as the current allocation destination of the segment 3 is 10001, the corresponding pool volume number 0001 is specified based on the chunk pool management table 165, and it is further specified that the performance of the pool volume is "Low" based on the performance field 1672 of the pool volume list table 167. The dynamic chunk allocation program 160 can change the allocation destination of the segment 3 to a chunk 20000 in the pool volume 1001 in which the performance field 1672 is "High".

As a result of the second process, the physical storage extent for storing data can be changed according to a policy set by the management computer 500 without changing the logical structure (segment arrangement) of the data volumes.

The second process can also be carried out when the access frequency to the chunk is changed. In this case, the volume management program 520 on the management computer 500 refers to the I/O frequency field 1655 of the chunk pool management table 165 to determine whether the performance of the pool volume is suitable for the current I/O frequency. The performance of the pool volume is recorded in the performance field 1672 of the pool list table 167. The volume management program 520 instructs the dynamic chunk allocation program 160 to change the allocation to a chunk of a pool volume with a higher performance if the I/O frequency field 1655 is high and change the allocation to a chunk with a lower performance if the I/O frequency field 1655 is low.

<C. External Storage Connection Function>

In FIG. 1, the host computer 10 and the first storage apparatus 100 are connected via the data network 50, and the first storage apparatus 100 and the second storage apparatus 200 are connected via the data network 51. The external storage connection function is a function for causing the host computer 10 to recognize data volumes (external volumes) in the second storage apparatus 200 as data volumes on the first storage apparatus 100 through a connection (external storage connection) between storage apparatuses.

The first storage apparatus 100 has the external storage connection function and is capable of reading and writing the data volumes on the second storage apparatus 200. In the present first embodiment, the external storage connection function is implemented as follows.

In FIG. 3, the external storage connection 900 causes the storage controller 150 to virtually recognize the data volume 212 on the second storage apparatus 200 as the data volume 112 on the first storage apparatus 100.

The external flag field 1634 of the data volume list table 166 is "Yes" for the data volume 212 connected with the first storage apparatus 100 by the external storage connection 900.

If the external flag field 1634 of the data volume as a target of a read/write command is "Yes", the response program 161 redirects the read/write command received from the host computer 10 by the storage controller 150 of the first storage apparatus 100 to the storage controller 250 of the second storage apparatus 200 via the data network 51. The storage controller 250 receives the redirected read/write command to read or write the recognized data volume (external volume) and returns the result to the first storage apparatus 100. As a result of the operation, the data volume in the second storage apparatus 200 can be accessed through the first storage apparatus 100.

<D. Volume Migration Function>

The volume migration program 521 instructs the first storage apparatus 100 to use the external storage connection function to recognize the data volume 212 in the second storage apparatus 200 as the data volume 112. The volume migration program 521 uses the function of the dynamic chunk allocation program 160 to create a DCAV 5002 and migrates the data inside the data volume 212 from the second storage apparatus 200 to the first storage apparatus 100. As a result of the procedures, the volume migration program 521 realizes the volume migration function. The volume migration function is realized by two processes of the volume migration program 521.

A first process is a process 901 of determining that the data volume 112 is a migration target and adding the data volume 112 to the chunk pool 110. The volume migration program 521 checks the migration target flag field 1635 of the data volume list table 163 to determine that the data volume 112 is the migration target and instructs the dynamic chunk allocation program 160 to add the data volume 112 to the chunk pool 110 as a pool volume 2001.

The dynamic chunk allocation program 160 does not allocate the chunks in the data volume 112 to other DCAVs and pool volumes until the allocation of the chunks in the data volume 112 to the DCAV 5002 is finished. Specifically, the chunks in the data volume in which the migration target flag field 1635 is "YES" are not allocated to the DCAVs and pool volumes other than the corresponding DCAV. Similarly, the chunks in which the allocated flag field 1634 is "YES" are not allocated to the DCAVs and pool volumes other than the DCAV as the migration destination.

Although the migration target flag field 1635 is held in the volume list table 163 on the storage controller 150 in the present first embodiment, for example, the management computer 500 may hold the field, or the field may be held in a specific storage extent of the data volume 112.

A second process is a process 902 of determining that the pool volume 2001 is a migration target and creating the DCAV 5002 in which the chunk 903 in the pool volume 2001 is associated as a segment (chunk 904) referenced by the host computer 10. The volume migration program 521 instructs the dynamic chunk allocation program 160 to create the DCAV management table 164 of the DCAV 5002. The dynamic chunk allocation program 160 extracts a record recording the chunk 903 in the pool volume 2001 on the chunk pool management table 165 and uses the record to update the DCAV management table 164.

As a result of the first process 901 and the second process 902 carried out by the volume migration program 521, the data volume 212 on the second storage apparatus 200 can be mapped to the DCAV 5002 created on the first storage apparatus 100. As a result of using the chunks in pool volumes (for example, pool volumes 0001 and 1001) on the first storage 100 as the chunks 904 of the DCAV 5002, the data can be migrated from the second storage apparatus 200 to the first storage apparatus 100 (process 905 of FIG. 3).

When all data held by the data volume 212 in the second storage apparatus 200 is migrated to the first storage apparatus 100, the volume migration program 521 deletes the data volume in the second storage apparatus 200 through the volume management program 520. Whether the data of the data volume 212 is migrated can be determined by referencing the chunk pool management table 165 and calculating the number of chunks allocated from the pool volume 2001 to the DCAV 5002.

Other than when all data in the data volume 212 is migrated, the deletion of the data volume 212 (pool volume 2001) can be carried out when the data in the data volume 212 is determined to be unnecessary based on a preset standard. In that case, data remained in the data volume 212 may be protected by, for example, copying the data to another pool volume that is not the deletion target.

Examples of the standard for determining the time to delete the data volume 212 include when the number of chunks to be allocated has reached zero, when the number of chunks to be allocated has reached a significantly small threshold, when the access frequency from the host computer 10 to the data volume 212 is significantly low, and when a certain time has passed after adding the pool volume 112 to the chunk pool 110.

To move the volume from the second storage apparatus 200 to the first storage apparatus 100 in the shortest possible time, for example, the chunk can be immediately migrated to the pool volume on the first storage apparatus 100 when the chunk on the data volume 112 is accessed.

<E. Process Flow>

Figure 10:
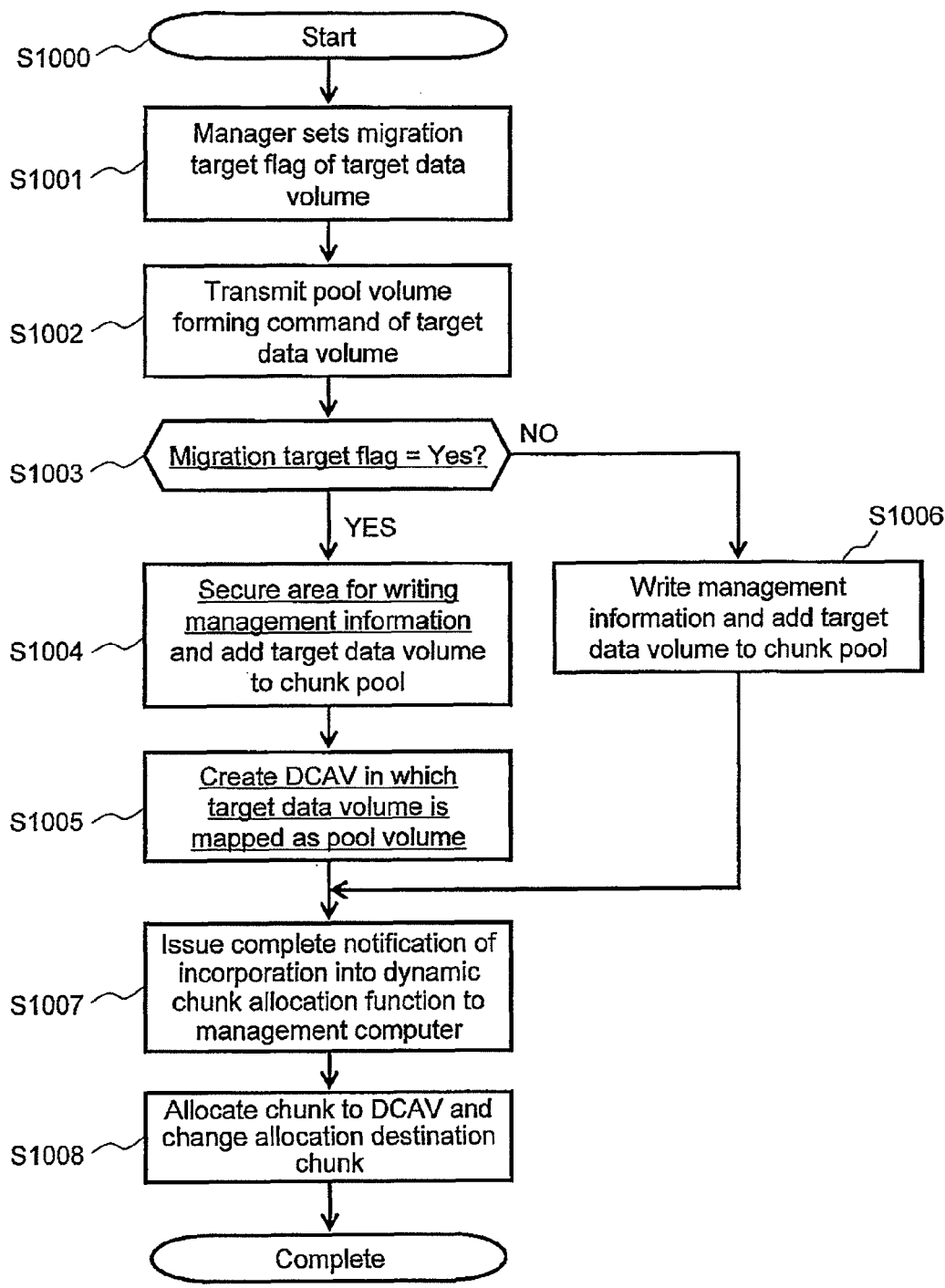
FIG. 10 is a diagram showing a processing flow of an external volume migration process carried out by a volume migration program 521.

FIG. 10 is a diagram showing a processing flow of an external volume migration process carried out by the volume migration program 521. Hereinafter, steps of FIG. 10 will be described.

(FIG. 10: Step S1000)

The present processing flow starts when the manager designates, for the volume migration program 521, a data volume that is in the second storage apparatus 200 and that is a target of migration of data to the first storage apparatus 100.

(FIG. 10: Step S1001)

Through the interface provided by the volume migration program 521, the manager instructs the first storage apparatus 100 to select a migration target from the data volume recognized on the first storage apparatus 100 and to set the migration target flag field 1635 indicative of the migration target. The data volume control program 162 updates the migration target flag field 1635 in accordance with the instruction.

(FIG. 10: Step S1002)

The volume migration program 521 transmits, to the volume management program 520, a command for instructing to add the target data volume 112 to the chunk pool 110 as a pool volume.

(FIG. 10: Step S1003)

The dynamic chunk allocation program 160 refers to a record related to the target data volume of the data volume list table 163 in accordance with the instruction from the volume management program 520 in step S1002 and acquires the value of the migration target flag field 1635. The process proceeds to step S1006 if the migration target flag field 1635 is not "Yes", and the process proceeds to step S1004 if the migration target flag field 1635 is "Yes". Steps S1004 and S1005 are steps by the volume migration program 521 controlling the programs in the first storage apparatus 100 and creating a DCAV holding the content of the selected target data volume.

(FIG. 10: Step S1004)

The dynamic chunk allocation program 160 adds the target data volume 112 to the chunk pool 110 as the pool volume 2001 in accordance with the instruction from the volume migration program 521. If the migration target flag field 1635 is "Yes", the dynamic chunk allocation program 160 does not allocate the chunk from the data volume 112 to other DCAVs. In the present step, a storage extent for writing management information necessary to create the DCAV can be separately reserved. Details of the present step will be described later.

(FIG. 10: Step S1005)

The dynamic chunk allocation program 160 creates the DCAV 5002 while protecting not to allocate the chunk in the target data volume 112 (chunk volume 2001) to other pool volumes. Details of the present step will be described later.

(FIG. 10: Step S1006)

Without causing the target data volume to be a DCAV, the dynamic chunk allocation program 160 adds the target data volume to the chunk pool 110 as a pool volume in which the content does not have to be protected. The management information may be written to the storage extent as necessary.

(FIG. 10: Step S1007)

The dynamic chunk allocation program 160 issues a complete notification of process to the volume management program 520. After the present step, the pool volume 2001 can be operated based on the dynamic chunk allocation function included in the first storage apparatus 100.

(FIG. 10: Step S1008)

The dynamic chunk allocation program 160 dynamically allocates the chunk in the pool volume 2001 to the DCAV 5002 or to another DCAV (for example, the DCAV 5001) or changes the allocation destinations of the chunks. If the pool volume 2001 is the migration target, the volume migration program 251 uses the function of the dynamic chunk allocation program 160 to change the allocation destination chunks so that the chunks in the pool volumes 0001 and 1001 in the first storage apparatus 100 are allocated as the chunks in the DCAV 5002 and migrates the data stored in the data volume 212 on the second storage apparatus 200 to the first storage apparatus 100 chunk-by-chunk. If the pool volume 2001 is not the migration target (if the migration target flag field 1635 is not "Yes"), the dynamic chunk allocation program 160 operates the pool volume 2001 as one of the pool volumes that can be used from the DCAVs on the first storage apparatus 100.

(FIG. 10: Step S1008: Supplement 1)

The processes of changing the allocation destination chunks for migrating the data include a process of referring to the external flag field 1634 of the data volume list table 163 to search the pool volume that is not the external volume and a process of referring to the migration target flag field 1635 to prohibit the allocation of the chunks in the migration target pool volume 2001 to the DCAVs other than the DCAV 5002.

(FIG. 10: Step S1008: Supplement 2)

A process of deleting the data volume 212 may be carried out after the data volume 212 (external volume) starts to operate as the pool volume 2001. If the volume migration program 521 determines that the data volume 212 is unnecessary, the data volume control program 162 deletes the record corresponding to the pool volume 2001 from the chunk pool management table 165 and the pool volume list table 167 and deletes the pool volume management table 166 of the pool volume 2001. The data volume control program 162 further deletes the record corresponding to the pool volume 2001 from the data volume list table 163, and the data volume control program in the second storage apparatus 200 deletes the data volume 212.

FIG. 11 is a diagram showing a change in the record in the data volume list table 163 based on the processing flow shown in FIG. 10. In a state shown in the upper part of FIG. 11, if the data volume 112 of the data volume number 2001 (the entity is the data volume 212 in the second storage apparatus 200) is set as a migration target, the migration target flag field 1635 is set to "Yes" (underlined part).

As a result of step S1004 of FIG. 10, the record corresponding to the data volume 112 (data volume number 2001) is changed as in the middle of FIG. 11. As a result of step S1005 of FIG. 10, a new record corresponding to the DCAV 5002 is added, and the state of the data volume list table 163 is as in the lower part of FIG. 11.

A detailed procedure of step S1004 will be described with reference to FIGS. 12 and 13.

Figure 12:
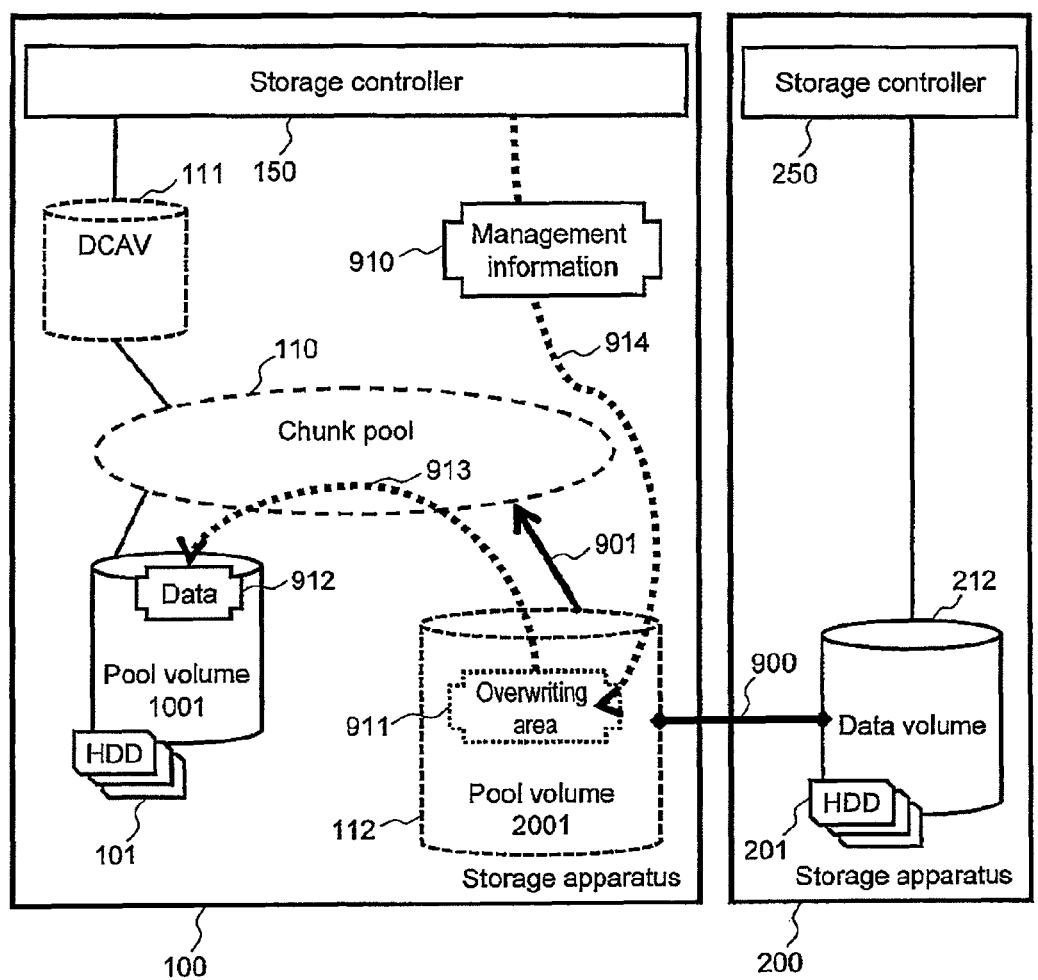
FIG. 12 is a diagram conceptually showing a detailed procedure related to management information in a process carried out in step S1004.

FIG. 12 is a diagram conceptually showing a detailed procedure related to the management information in the process carried out in step S1004. When the data volume 112 is added to the chunk volume 110 as the pool volume 2001 in step S1004, the dynamic chunk allocation program 160 sometimes writes management information 910 necessary to implement the dynamic chunk allocation function to the data volume 112 (or secures an area for writing).

The management information 910 is information referenced from the dynamic chunk allocation program 160, such as the chunk pool management table 165, the pool volume management table 166, and the pool volume list table 167. When the data volume 112 is the migration target, the data in the data volume 112 is overwritten as a result of writing the management information 910. Therefore, the data existed in the data volume 112 needs to be appropriately protected.

Before the management information 910 is written to the data volume 112, the dynamic chunk allocation program 160 retracts data 912 stored in an area 911 overwritten by the management information 910 to another pool volume (for example, the pool volume 1001). Examples of a method of selecting the pool volume for saving the data 912 include a method of selecting another pool volume with a low performance from the perspective that the performance for the management information 910 does not have to be secured and a method of selecting a pool volume generated by a set of physical storage devices (such as another RAID group) in which a physical trouble does not spread from the perspective of reliability.

Figure 13:
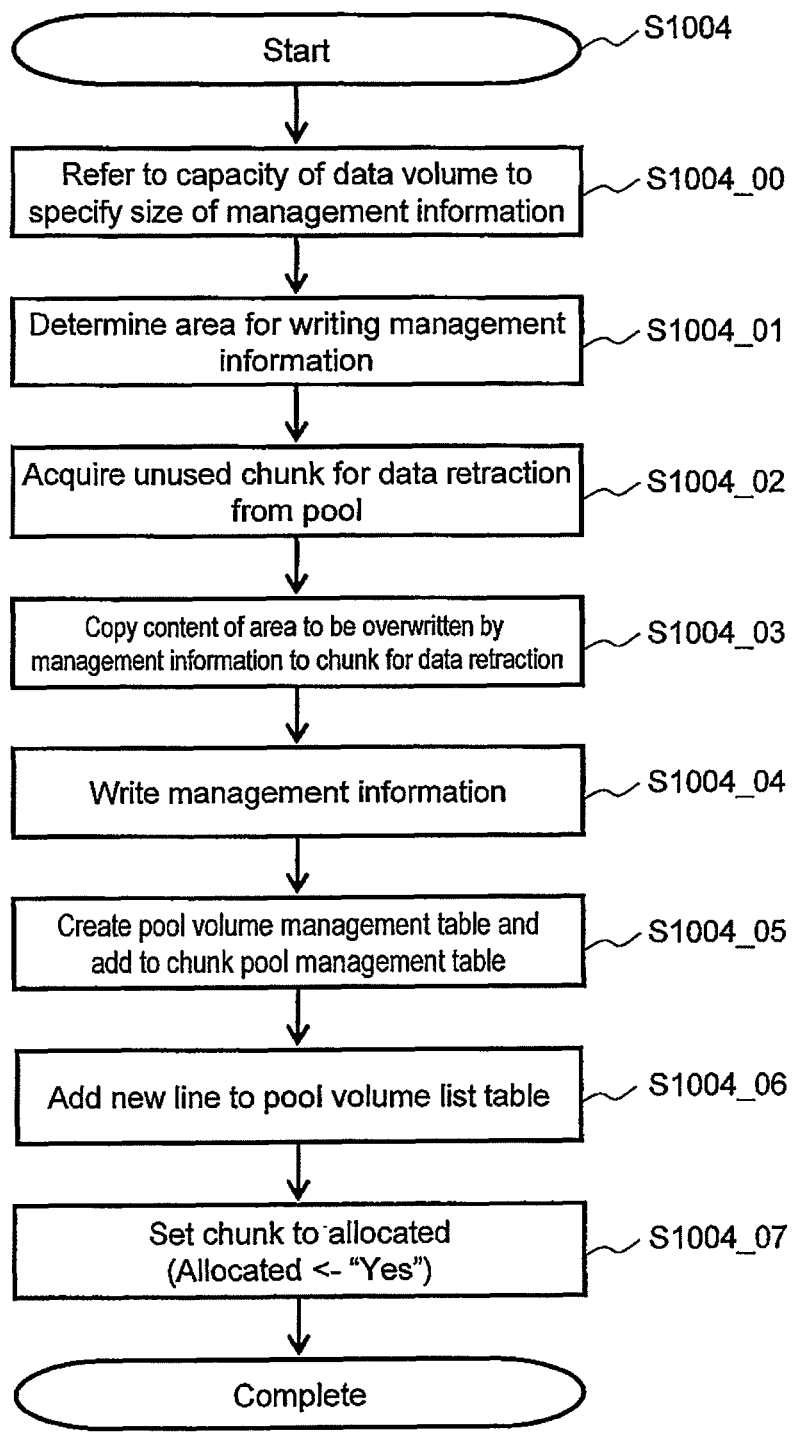
FIG. 13 is a flow chart showing the detailed procedure of step S1004 described in FIG. 12.

FIG. 13 is a flow chart showing a detailed procedure of step S1004 described in FIG. 12. Hereinafter, steps of FIG. 13 will be described.

(FIG. 13: Step S1004_00)

When the size of the management information 910 depends on the capacity of the data volume 112, the dynamic chunk allocation program 160 determines the size of the management information 910 written to the data volume 112.

(FIG. 13: Step S1004_01)

The dynamic chunk allocation program 160 determines the area 911 for writing the management information 910. In the present step, the size of the data 912 retracted from the data volume 112 is determined.

(FIG. 13: Steps S1004_02 to S1004_04)

The dynamic chunk allocation program 160 acquires an unused chunk with the same or larger capacity than the data 912 from the chunk pool 110 (S1004_02). The dynamic chunk allocation program 160 copies the data 912 to the unused chunk acquired from the area 911 in step S1004_02 (S1004_03). The dynamic chunk allocation program 160 writes the management information 910 to the data volume 112 (S1004_04)

(FIG. 13: Step S1004_05)

The dynamic chunk allocation program 160 divides the data area of the data volume 112 (part excluding the management information 910 in the data volume 112) into chunks and creates the pool volume management table 166. The type field 1633 of the data volume management table 163 is changed to "Pool Volume" for the data volume 112. The chunks of the data area of the data volume 112 and the chunks for storing the retracted data 912 are combined and registered in the chunk pool management table 165.

(FIG. 13: Step S1004_06)

The dynamic chunk allocation program 160 adds a new record corresponding to the pool volume 2001 to the pool volume list table 167. At the same time, the performance field 1672 of the added record is set. The value of the performance field 1672 can be calculated based on the types of the physical devices 101 and 102 held by the storage controller 150 (for example, SSD/HDD), the types of the connection interfaces (for example, SATA/SAS), and the like, and reading and writing can be experimentally carried out to reflect the result of the measurement of the performance.

(FIG. 13: Step S1004_07)

The dynamic chunk allocation program 160 changes the allocated flag field 1654 of the record changed in step S1004_05 in the chunk pool management table 165 to "Yes" indicative of the chunk allocated to the DCAV (see FIG. 17 described later) to avoid the chunk from being allocated to other DCAVs.

Figure 14:
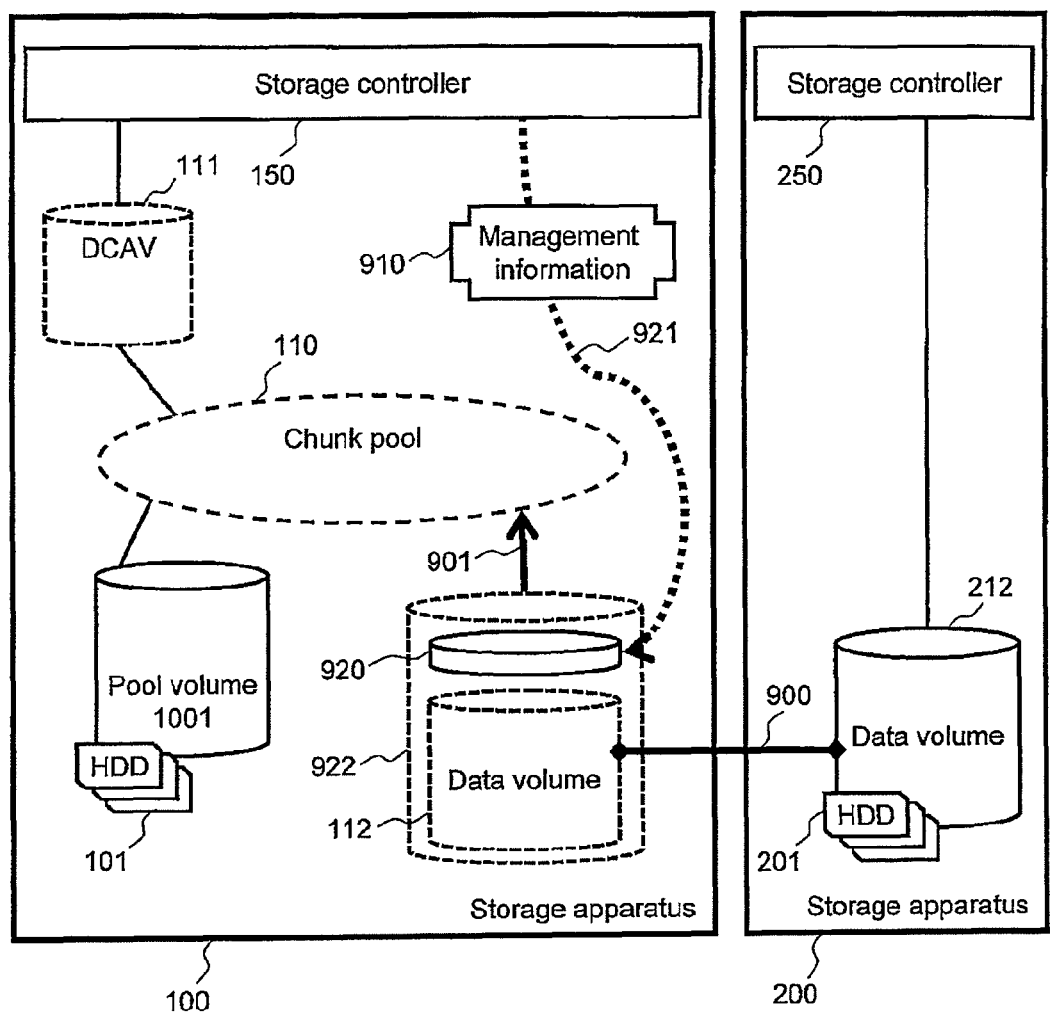
FIG. 14 is a diagram showing an example different from FIG. 12 of the detailed procedure related to the management information in the process carried out in step S1004.

FIG. 14 is a diagram showing an example different from FIG. 12 of the detailed procedure related to the management information in the process carried out in step S1004. Compared to the procedure described in FIG. 12, the method of protecting the data overwritten by writing of the management information 910 is different. The method shown in FIG. 14 is different in that the area for writing the management information 910 is created as a new data volume 920 different from the data volume 112.

Figure 15:
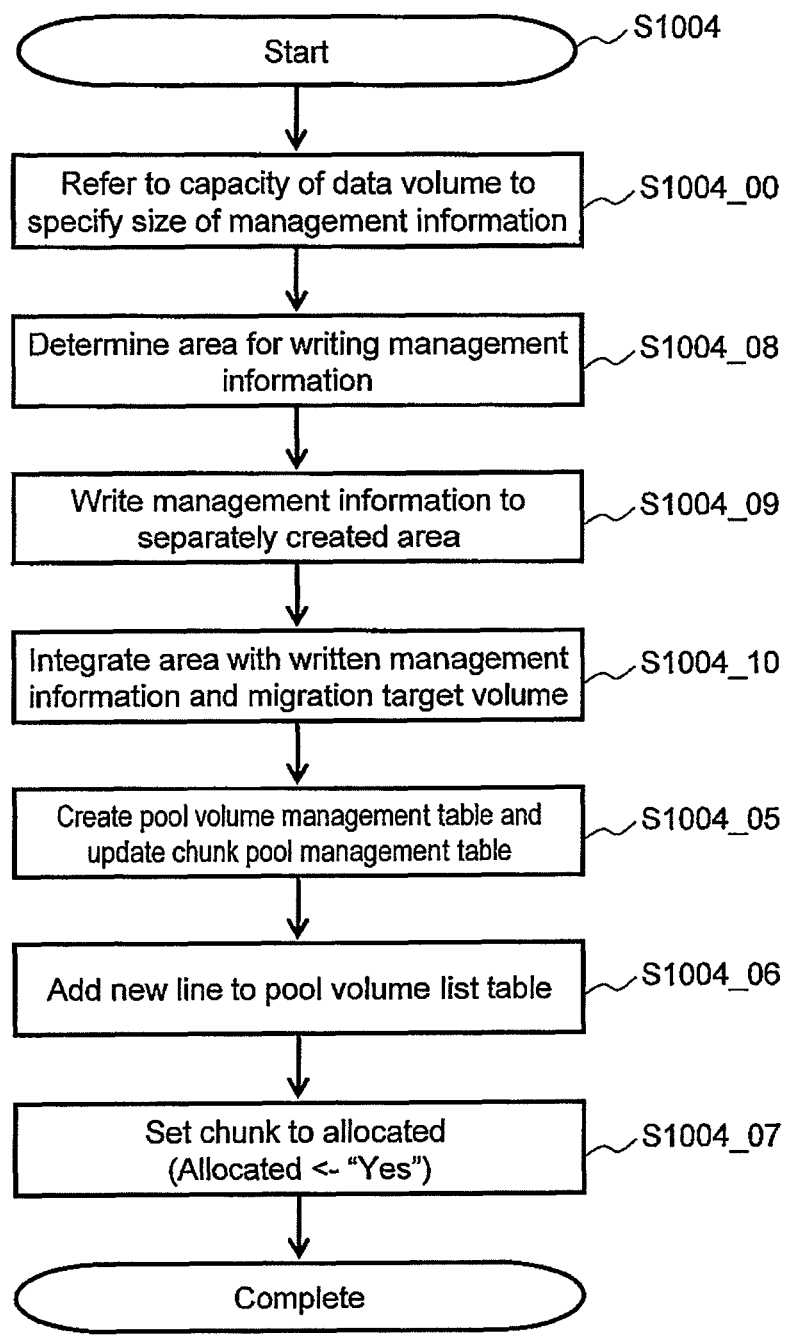
FIG. 15 is a flow chart showing the detailed procedure of step S1004 described in FIG. 14.

FIG. 15 is a flow chart showing a detailed procedure of step S1004 described in FIG. 14. Hereinafter, steps of FIG. 15 will be described.

(FIG. 15: Step S1004_00)

The present step is the same as the same step of FIG. 13. Following the present step, step S1004_08 is carried out in place of step S1004_01.

(FIG. 15: Step S1004_08)

The data volume control program 162 creates the data volume 920 for writing the management information 910 in addition to the data volume 112. If the size of the management information 910 depends on the capacity of the data volume 112, the necessary size is calculated in step S1004_00, and the data volume for the capacity is created in the present step.

(FIG. 15: Step S1004_08: Supplement)

In the present step, if there is a storage extent that can store the management information 910, for example, the storage extent on the memory 152 may be secured in place of the data volume 920 in the first storage apparatus 100.

(FIG. 15: Step S1004_09)

The dynamic chunk allocation program 160 writes the management information 910 to the data volume 920.

(FIG. 15: Step S1004_10)

The data volume control program 162 integrates the data volume 920 and the data volume 112 so that the volumes look like one data volume 922 from the storage controller 150.

(FIG. 15: Step S1004_10: Supplement)

The data volume 920 and the data volume 112 do not necessarily have to be integrated in the present step if the management information 910 and the data area can be separately stored.

(FIG. 15: Steps S1004_05 to S1004_07)

Following step S1004_09, the same processes as in steps S1004_05 to S1004_07 described in FIG. 13 are carried out.

Figure 16:
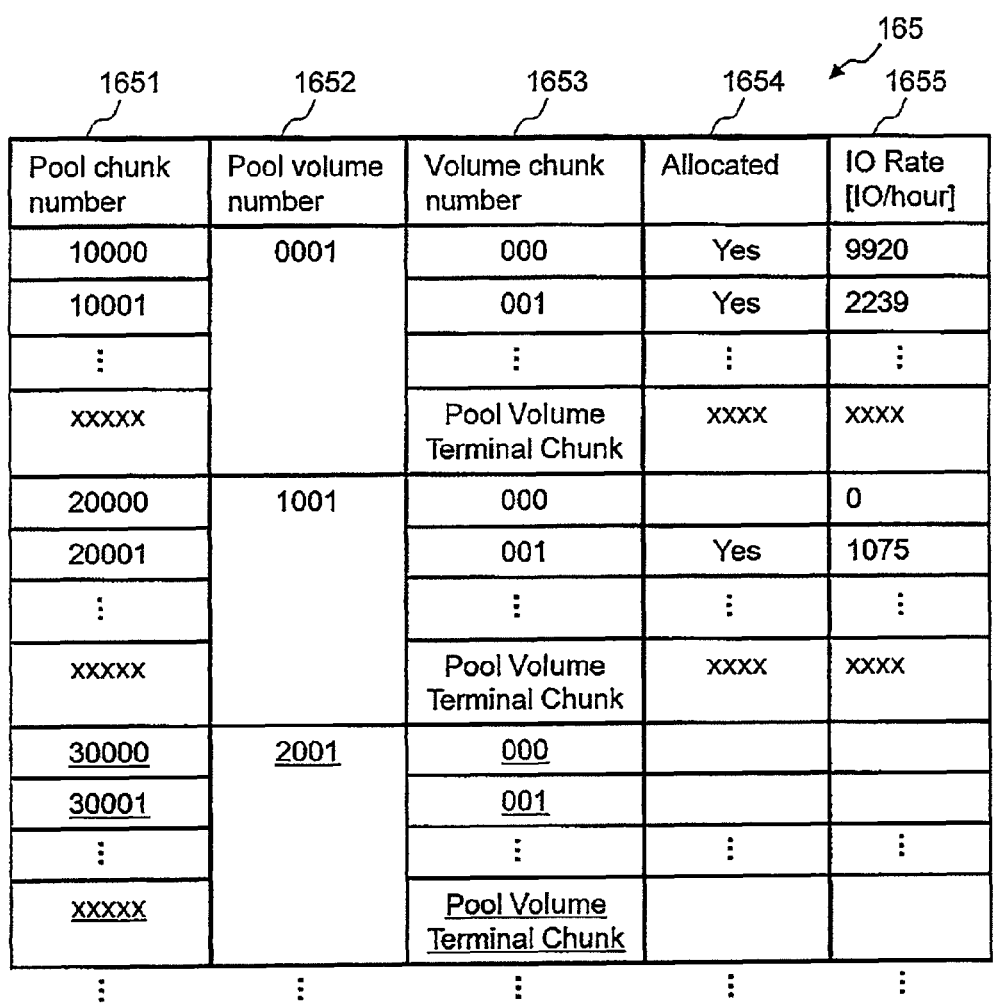
FIG. 16 is a diagram showing a change of a record in the chunk pool management table 165 based on the processing flow shown in FIG. 13 or 15.

FIG. 16 is a diagram showing a change in the record in the chunk pool management table 165 based on the processing flow shown in FIG. 13 or 15. As a result of step S1004_05 of FIG. 13 or 15, the chunk pool management table 165 is changed from the state of FIG. 8 to the state of FIG. 16 in which the record related to the pool volume 2001 is added.

FIG. 17 is a diagram showing a change in the record in the chunk pool management table 165 based on the processing flow shown in FIG. 13 or 15. As a result of step S1004_07 of FIG. 13 or 15, the chunk pool management table 165 is changed from the state of FIG. 16 to the state of FIG. 17 in which the allocated flag field 1654 is changed to "Yes".

Figure 18:
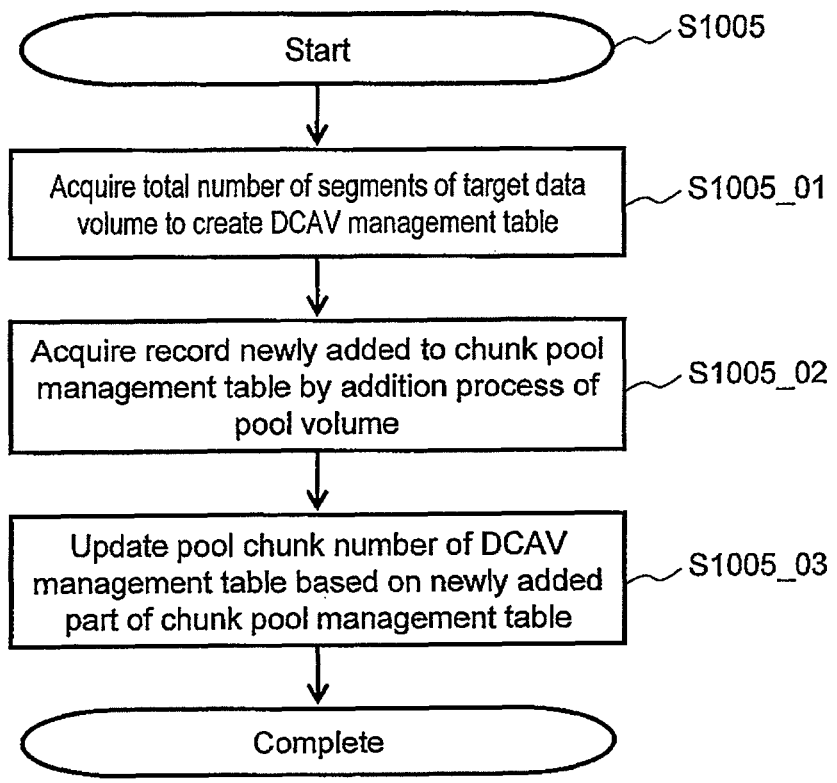
FIG. 18 is a flow chart showing the detailed procedure of step S1005 described in FIG. 10.

FIG. 18 is a flow chart showing a detailed procedure of step S1005 described in FIG. 10. Hereinafter, steps of FIG. 18 will be described.

(FIG. 18: Step S1005_01)

The data volume control program 163 newly creates a data volume (DCAV 5002) and registers the data volume in the data volume list table 163. The value of the type field 1633 is set to "DCAV". The dynamic chunk allocation program 160 creates the DCAV management table 164 with the number of records that can associate all chunks of the pool volume 2001.

(FIG. 18: Step S1005_01: Supplement)

The processes carried out in the present step include a process of calculating the total number of segments and the total number of chunks of the DCAV 5002 from the capacity field 1632 corresponding to the data volume 112 as the migration target and a process of calculating the total number of segments and the total number of chunks from the pool volume 2001 when the data volume 112 is added to the chunk pool 110.

(FIG. 18: Step S1005_02)

The dynamic chunk allocation program 160 acquires the pool chunk number field 1642 of the record newly added to the chunk pool management table 165 in step S1004 (record corresponding to the pool volume 2001).

(FIG. 18: Step S1005_03)

The dynamic chunk allocation program 160 uses the pool chunk number field 1642 acquired in step S1005_02 to update the DCAV management table 164.

(FIG. 18: Step S1005_03: Supplement)

As shown in FIG. 11, the data volume number (for example, 2001) used to recognize the data volume 212 (data volume 112) from the storage controller 150 is different from the data volume number (for example, 5002) of the DCAV newly created in step S1005. If the host computer 10 uses the data volume numbers to uniquely recognize the data volumes, the data volume numbers may be replaced in step S1005 if necessary to present the same volume number to the host computer 10.

First Embodiment

Summary

As described, according to the present first embodiment, a data volume, in which data is stored and the dynamic chunk allocation function cannot be used, can be used to create a DCAV storing the same content without migrating the data. As a result, necessary data in the data volume can be migrated chunk-by-chunk as necessary between storage apparatuses. Therefore, compared to a method of creating a copy of a data volume to migrate data between storage apparatuses, the storage capacity can be efficiently improved, and the communication band between storage apparatuses necessary for the data migration can be reduced.

According to the present first embodiment, existing data volumes created from physical storage devices with uniform performances can be converted to DCAVs while maintaining the contents, and physical storage extents with performances corresponding to the use frequencies can be allocated chunk-by-chunk. As a result, the cost performance of the data volumes can be improved. The detail of such an implementation will be described in the second embodiment below.

The first storage apparatus 100 can use a data volume held by an existing storage apparatus as a data volume of the first storage apparatus 100 to migrate data. As a result, the cost performance of the entire storage system can be improved just by implementing the first storage apparatus 100 in an existing system without changing the existing storage apparatus.

Second Embodiment

Although an example of migrating data from the second storage apparatus 200 connected outside the first storage apparatus 100 has been described in the first embodiment, a similar method can also be applied to the data volumes in the first storage apparatus 100. An example of the operation will be described in a second embodiment of the present invention.

Figure 19:
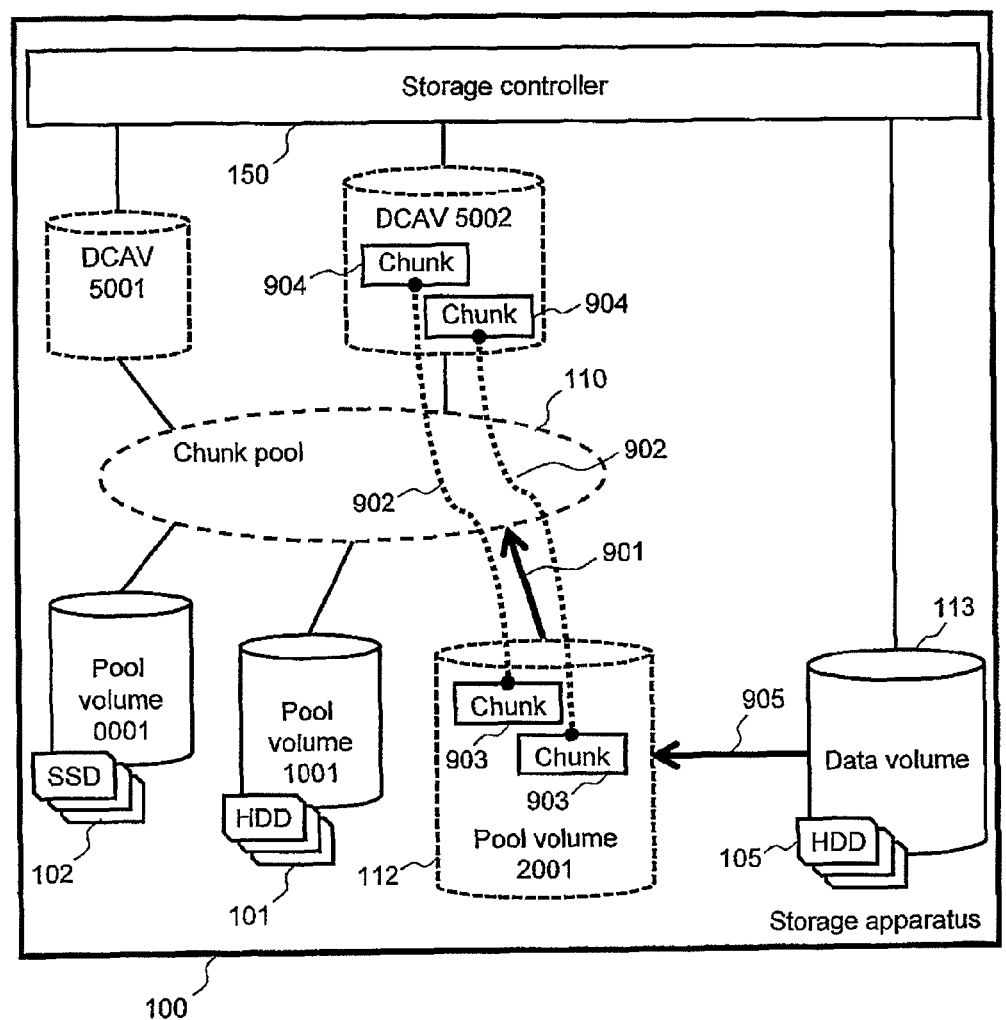
FIG. 19 is a diagram showing a logical configuration of a storage extent in the first storage apparatus 100 according to a second embodiment.

FIG. 19 is a diagram showing a logical configuration of the storage extent in the first storage apparatus 100 according to the present second embodiment. In the present second embodiment, the data volume 113 in the first storage apparatus 100 is a target of data migration.

A procedure of migrating the data in the data volume 113 to another pool volume by converting the target data volume 113 to the DCAV 5002 is the same as in the first embodiment except that the data volume 113 is the target instead of the data volume 112. More specifically, except the point that the data volume 113 is not created by the external storage connection function, the data volume in the first storage apparatus 100 can be migrated to another pool volume by the same procedure as in the first embodiment.

Third Embodiment

In a third embodiment of the present invention, an example of configuration of using the volume migration function described in the first and second embodiments to migrate a virtual disk used by a virtual machine (Virtual Machine) chunk-by-chunk will be described.

FIGS. 20(a) and 20(b) are diagrams showing data and the like stored in the memory 12 on the host computer 10 and the memory 512 on the management computer 500 according to the present third embodiment.

In the present third embodiment, a host OS 17 and a virtualization program 18 are executed on the host computer 10. The virtualization program 18 operates one or more VMs 20 that execute guest OSs 21 and the applications 14 on the guest OSs 21. The virtualization program 18 manages the configuration of the VMs 20 based on VM configuration information 19.

The memory 512 of the management computer 500 stores a VM management program 530 that manages the VMs 20 on the host computer 10 in addition to the volume management program 520 and the volume migration program 521 described in the first embodiment. The memory 512 further stores a VM management table 531 and a virtual disk management table 532. Configurations of the tables will be described later.

Figure 21:
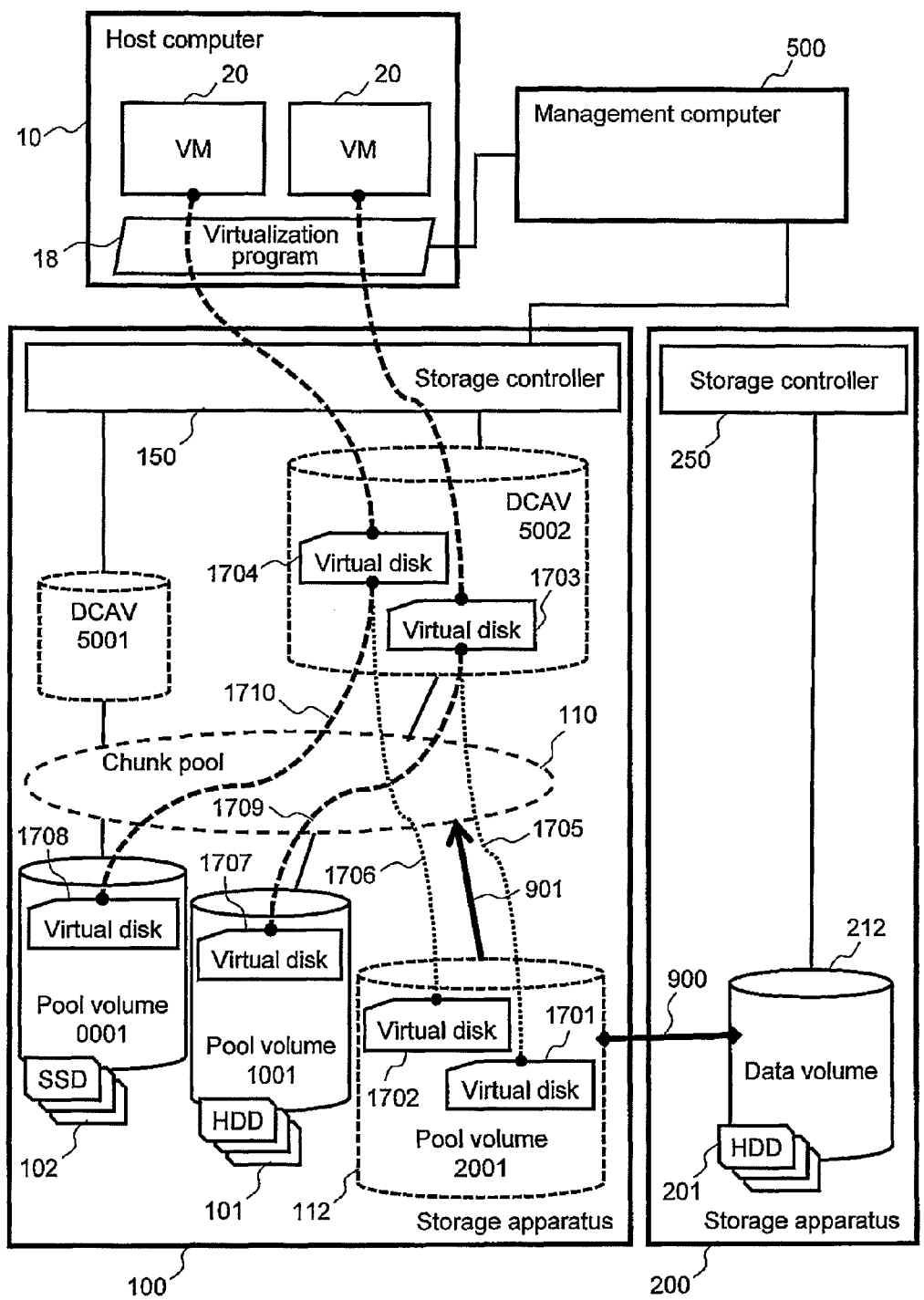
FIG. 21 is a diagram showing a logical configuration of the storage extent in the first storage apparatus 100 according to the third embodiment.

FIG. 21 is a diagram showing a logical configuration of the storage extent in the first storage apparatus 100 according to the present third embodiment. The data volume 212 in the second storage apparatus 200 holds virtual disks 1701 and 1702 for use by the VMs 20 executed on the host computer 10. The virtual disks 1701 and 1702 are logical storage extents that the host OS 17 on the host computer 10 can recognize as files and are constituted as virtual disk images storing the guest OSs 21. The virtualization program 18 reads out the guest OSs 21 from the virtual disks and loads the guest OSs 21 to the memory 12 to execute the VMs 20.

In the environment in which the storage controller 150 provides the virtual disks 1701 and 1702 in the data volume 212 for the VMs 20, the DCAV 5002 is created from the data volume 212 based on the volume migration function described in the first and second embodiments to cause the host computer 10 to recognize the DCAV 5002 (process 901, mapping 1705 and 1706). As a result, the host computer 10 can use the virtual disks 1703 and 1704 in the DCAV 5002 to operate the VMs 20. The virtual disks 1701 and 1702 can be migrated to the pool volumes 0001 and 1001 in the first storage apparatus 100 chunk-by-chunk based on the dynamic chunk allocation function, and the virtual disks can be migrated from the second storage apparatus 200 to the first storage apparatus 100.

Although the virtual disks are migrated altogether in the description for the convenience of description in FIG. 21, since the data can be migrated chunk-by-chunk based on the dynamic chunk allocation function, one virtual disk may be divided and arranged on a plurality of pool volumes.

Figure 22:
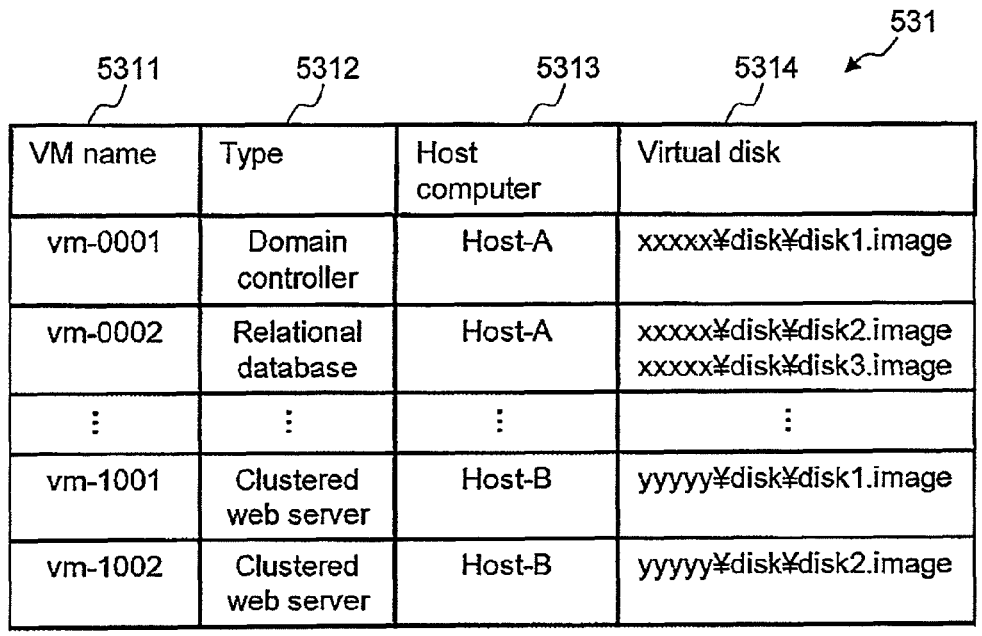
FIG. 22 is a diagram showing an example of configuration of a VM management table 531.

FIG. 22 is a diagram showing an example of configuration of the VM management table 531. The VM management table 531 is a table for managing the configurations of the VMs 20 on the host computer 10 and holds all or part of the VM configuration information 19 acquired by the VM management program 530 through the virtualization program 18.

The VM management table 531 includes a VM name field 5311, a type field 5312, a host computer field 5313, and a virtual disk field 5314. The VM name field 5311 holds names for identifying the VMs 20. The type field 5312 describes types of the services provided by the VMs 20 identified by the VM name field 5311. The host computer field 5313 holds identifiers of the host computers 10 that execute the VMs 20 identified by the VM name field 5311. The virtual disk field 5314 holds file paths of the virtual disks constituting the VMs 20 identified by the VM name field 5311.

Figure 23:
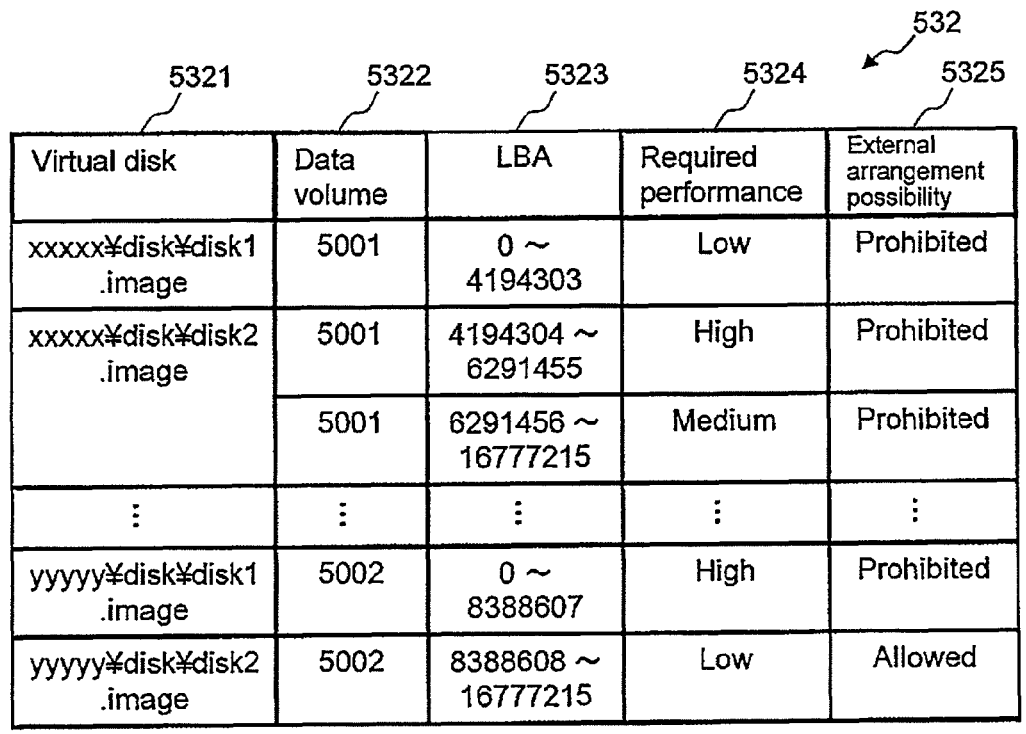
FIG. 23 is a diagram showing an example of configuration of a virtual disk management table 532.

FIG. 23 is a diagram showing an example of configuration of the virtual disk management table 532. The virtual disk management table 532 is a table for managing the virtual disks of the VMs 20 and includes a virtual disk field 5321, a data volume field 5322, an LBA field 5323, a required performance field 5324, and an external arrangement possibility field 5325.

The virtual disk field 5321 is a field for holding the file paths of the virtual disks constituting the VMs 20 and corresponds to the virtual disk field 5314. The data volume field 5322 holds identification numbers of data volumes storing the virtual disks. The LBA field 5323 holds logical address ranges on the data volumes storing the virtual disks. The required performance field 5324 holds performance values required for the data volumes storing the virtual disks. The external arrangement possibility field 5325 holds flags indicating whether the virtual disks can be stored in an external storage apparatus (for example, the second storage apparatus 200).

The manager of the computer system 1000 sets the required performance field 5324 and the external arrangement possibility field 5325 through the VM management program 530. The fields can be set for each virtual disk or can be set for specific LBA ranges in the virtual disks. The manager does not necessarily have to designate the LBA field 5323. For example, the manager may designate guest OS boot areas, application areas, and data areas in the virtual disks, and another program (for example, the virtualization program 18 or the OS host OS 17) may convert the areas to the LBA field 5323.

Figure 24:
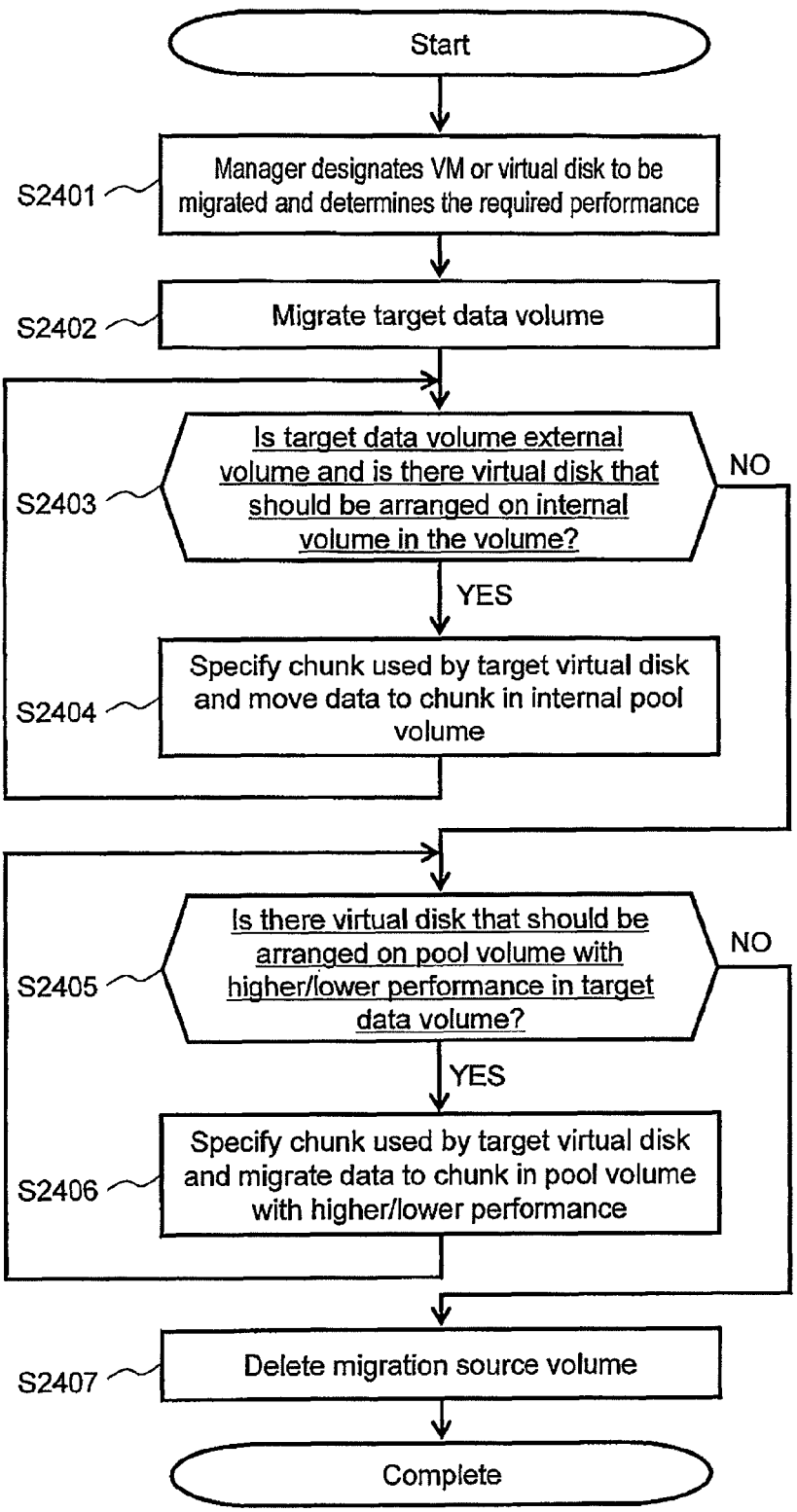
FIG. 24 is a diagram showing a processing flow of migration of a virtual disk by the first storage apparatus 100 according to the third embodiment.

FIG. 24 is a diagram showing a processing flow of migration of a virtual disk by the first storage apparatus 100 according to the present third embodiment. Hereinafter, steps of FIG. 24 will be described.

(FIG. 24: Step S2401)

The manager determines whether to set each VM 20 or each virtual disk to a migration target and determines required performances through the VM management program 530. The VM management program 530 sets the required performance field 5324 and the external arrangement possibility field 5325 of the virtual disk management table 532 according to the determination of the manager.

(FIG. 24: Step S2402)

The VM management program 530 refers to the VM management table 531 and the virtual disk management table 532 to specify the data volume 212 storing the designated VM 20 or virtual disk designated as the migration target. The VM management program 530 further orders the volume migration program 521 to create the DCAV 5002 from the target data volume 212. The volume migration program 521 creates the DCAV 5002 in the procedure described in the first embodiment and transmits a complete notification to the VM management program 530. The VM management program 530 or the volume migration program 521 updates the data volume field 5322 of the virtual disk management table 532.

(FIG. 24: Step S2402: Supplement)

In the present step, a process different from the first embodiment is necessary to carry out the process of creating the pool volume management table 166 (equivalent to step S1004_05 of FIG. 13 or 15) in the process of adding the target data volume 212 to the chunk pool 110 (equivalent to step S1004 of the first embodiment). As described, the required performance field 5324 and the external arrangement possibility field 5325 of the virtual disk are sometimes set to the LBA field 5323 of the virtual disk management table 532. Therefore, the migration destination of chunk needs to be set for each range designated by the LBA field 5323.

(FIG. 24: Step S2403)

The VM management program 530 or the volume migration program 521 refers to the external flag field 1634 of the data volume list table 163 through the volume management program 520 and compares the field with the external arrangement possibility field 5325 of the virtual disk management table 532. If a virtual disk that is not allowed to be arranged on the external volume 212 is arranged on the external volume 212, the process proceeds to step S2404. If not, the process skips to step S2405.

(FIG. 24: Step S2404)

The volume migration program 521 refers to the data volume list table 163 to instruct the dynamic chunk allocation program 160 to allocate the chunk of the virtual disk part specified in step S2403 from another pool volume (for example, the pool volume 0001 or 1001) that is not an external volume.

(FIG. 24: Step S2405)

The VM management program 530 or the volume migration program 521 compares the required performance field 5324 of the virtual disk management table 532 with the performance of the chunk allocated to the virtual disk. The performance of the chunk allocated to the virtual disk can be determined by referring to the performance field 1672 of the pool volume list table 167 for the pool volume holding the allocation destination chunk. If the required performance field 5324 of the virtual disk and the performance of the chunk (performance field 1672) are different, the process proceeds to step S2406. If there is no chunk in which the required performance field 5324 and the performance field 1672 are different, the process skips to step S2407.

(FIG. 24: Step S2406)

The dynamic chunk allocation program 160 changes the allocation destination of the chunk specified in step S2405 to a chunk that satisfies the required performance field 5324. However, if the arrangement on the external volume 212 is not permitted in the external arrangement possibility field 5325, the external flag field 1634 is referenced to allocate the chunk to a pool volume that is not an external volume.

(FIG. 24: Steps S2403 and S2405: Supplement)

To satisfy the required performance field 5324 and the external arrangement possibility field 5325, the determinations in the steps may be repeated according to the number of the VMs 20 or the virtual disks, or the execution order may be changed. A comprehensive determination with a combination of the processes may also be carried out.

(FIG. 24: Step S2407)

After the completion of the migration of all virtual disks as the migration targets arranged on the external volume 212, the data volume control program on the second storage apparatus 200 deletes the external volume 212 (migration source volume). However, as in the first embodiment, the process of protecting the remaining data may be carried out before deleting the external volume 212. Alternatively, the present step may be skipped if part of the virtual disks is to be left on the external volume 212 or if the external volume 212 is to be continuously used as the pool volume 2001.

The procedure of migrating the virtual disk has been described. Hereinafter, a point that needs to be paid attention in migrating the virtual disk will be supplemented.

A big difference between the first and second embodiments and the third embodiment is that while the required performances are set for the chunks of the DCAVs in the first and second embodiments, the required performances are set for specific areas of the virtual disks in the third embodiment.

The required performance field 5324 and the external arrangement possibility field 5325 are set for the LBA field 5323 recorded in the virtual disk management table 532. The boundary of the storage extent designated by the LBA field 5323 and the boundary of the storage extent designated by the LBA field 1664 of the chunks in the pool volume divided into chunks may not necessarily match.

The boundary mismatch of the LBA ranges is particularly a problem when the virtual disk management table 532 is referenced to change the allocation destination chunk. For example, when one chunk is created across storage extents with different LBA field 5323 of the virtual disk management table 532, different required performance field 5324 and external arrangement possibility field 5325 are applied to the same chunk, and the process of changing the allocation destination of the chunk cannot be completed.

To prevent this, for example, the LBA field 1664 of the chunk can be corrected to be identical with the boundary of the LBA field 5323 of the virtual disk management table 532 in step S2402. Conversely, the LBA field 5323 of the virtual disk management table 532 may be corrected in accordance with the LBA field 1664 of the chunk. Alternatively, in steps S2404 and S2406, the process of changing the chunk allocation destination of each virtual disk can be executed once for each virtual disk, and the LBA range carried out later in steps S2404 and S2406 can be prioritized to reflect the required performance field 5324 or the external arrangement possibility field 5325.

Third Embodiment

Summary

As described, according to the present third embodiment, only the virtual disk constituting the VM 20 in use can be selectively migrated when the virtual disk constituting the VM 20 in use and the virtual disk constituting the VM 20 not in use are arranged on the same data volume.

According to the present third embodiment, the storage extent satisfying the required performance can be allocated to each VM 20 to start the use without waiting for the completion of the migration of all VMs 20 in the same data volume.

According to the present third embodiment, only a specific area can be selectively migrated within the same virtual disk chunk-by-chunk. In the migration of the VM 20, the virtual disk (image file) can be divided into chunks, and the virtual disk can be efficiently migrated in more detail in accordance with the access pattern to the virtual disk.

Fourth Embodiment

Although an example of the processing flow of migrating the virtual disk based on the required performance has been described in FIG. 24 of the third embodiment, the following methods can be considered as a method of migrating the virtual disk. The methods can be arbitrarily combined.

(Virtual Disk Migration Procedure 1)

There may be a case in which the manager sets only the external arrangement possibility field 5325 without setting the required performance field 5324. In this case, only the external arrangement possibility field 5325 is set to designate the migration target in step S2401 among the steps shown in FIG. 24. In steps S2405 and S2406, the dynamic chunk allocation program 160 refers to the I/O frequency field 1655 to change the allocation destination of chunk to the pool volume with a performance corresponding to the use frequency without imposing a burden on the manager.

(Virtual Disk Migration Procedure 2)

When there is an access to the address range designated by the LBA field 5323 held in the virtual disk management table 532, all allocation destinations of chunks within the same address range of the same virtual disk may be changed to the chunks of the pool volumes in the first storage apparatus 100. As a result, the entire virtual disk can be migrated from the external volume in the second storage apparatus 200 to the pool volumes in the first storage apparatus 100 when part of the virtual disk is accessed.

(Virtual Disk Migration Procedure 3)

A method of migrating a virtual disk in collaboration with the VM management program 530 can be considered. For example, a virtual disk (or a boot area in the virtual disk) is moved from the external volume 212 to other pool volumes 0001 and 1001 in synchronization with a VM activation command when the VM management program 530 activates the VM 20 through the virtualization program 18 on the host computer 10 or in synchronization with a process of reading out the configuration information 19 by the virtualization program 18. As a result, upon the activation of the VM 20, an increase in the use frequency of the virtual disk used by the VM 20 can be predicted to migrate the virtual disk to speed up the activation of the VM and to improve the I/O performance.

(Virtual Disk Migration Procedure 4)

The VM management program 530 can refer to the VM management table 531 to figure out the type of the service provided by the VM 20. The virtual disk can be migrated based on this. For example, when a role of a VM 20 functions in conjunction with another VM 20, such as when the VM 20 has a role of an application server, a domain controller, a network gateway, and the like in which the load is dispersed among a plurality of servers, the VM management program 530 may figure out the relationship to migrate a related virtual disk of the VM 20 at the same time. Furthermore, when a role of a VM 20 exclusively functions independently from the other VMs 20 to improve the reliability, such as in a case of an operation-system server and a standby-system server when the VM 20 has a cluster configuration, the VM management program 530 may figure out the relationship to migrate the virtual disks to different pool volumes.

REFERENCE SIGNS LIST 10 host computer
11 CPU
12 memory
13 operating system
14 application program
15 fibre channel interface
16 ethernet interface
17 host operating system
18 virtualization program
19 virtual machine configuration information
20 virtual machine
21 guest operating system
50 host data network
51 inter-storage data network
100 first storage apparatus
110 chunk pool
150 storage controller
160 dynamic chunk allocation program
161 response program
162 data volume control program
163 data volume list table
164 dynamic chunk allocation volume management table
165 chunk pool management table 166 pool volume management table
167 pool volume list table
200 second storage apparatus
250 storage controller
500 management computer
520 volume management program
521 volume migration program
530 virtual machine management program
531 virtual machine management table
532 virtual disk management table

The invention claimed is:

1. A storage apparatus comprising:
first and second storage units that store data; and
a controller that reads and writes data to and from the first and second storage units, wherein
the first storage unit
constitutes pool volumes including one or more chunks as aggregations of data blocks in the first storage unit, and
the controller
consolidates chunks that can be dynamically allocated to other pool volumes among the chunks in the pool volumes to constitute a chunk pool as a set of the chunks,
uses the chunks in the chunk pool to create a logical data volume to provide the logical data volume to a higher-level apparatus, and
adds a storage extent in the second storage unit to the chunk pool as the chunks to dynamically allocate the chunks in the chunk pool to the newly created logical data volume to migrate data in the second storage unit to the first storage unit.

2. The storage apparatus according to claim 1, wherein
the second storage unit
is constituted as an external storage device connected outside the storage apparatus, and
the controller
presents the second storage unit as a logical data volume included in the storage apparatus to the higher-level apparatus, and under the circumstance, adds the storage extent in the second storage unit to the chunk pool as the chunks.

3. The storage apparatus according to claim 1, wherein
the controller
prohibits allocation of the chunks added to the chunk pool from the second storage unit to other existing logical data volumes and to other exiting pool volumes, from the addition of the storage extent in the second storage unit to the chunk pool as the chunks to the end of the dynamic allocation of all chunks in the second storage unit to the logical data volume.

4. The storage apparatus according to claim 1, wherein
the controller
retracts data in the storage extent for writing management information used to manage the logical data volume to another pool volume in the first storage unit to write the management information in the storage extent that has become empty by the retraction, before adding the storage extent in the second storage unit to the chunk pool as the chunks.

5. The storage apparatus according to claim 1, wherein
the controller
newly secures the storage extent for writing the management information used to manage the logical data volume to write the management information in the newly secured storage extent, before adding the storage extent in the second storage unit to the chunk pool as the chunks.

6. The storage apparatus according to claim 1, wherein
the controller
releases the storage extent used by the second storage unit when a parameter indicating a use status of the second storage unit has become a predetermined value, after adding the storage extent in the second storage unit to the chunk pool as the chunks.

7. The storage apparatus according to claim 6, wherein
the parameter indicating the use status of the second storage unit includes at least one of a used capacity of the second storage unit, a data I/O frequency of the second storage unit, and an elapsed time from the addition of the storage extent in the second storage unit to the chunk pool as the chunks.

8. The storage apparatus according to claim 1, wherein
the controller
inherits an identifier of the second storage unit as seen from the higher-level apparatus as an identifier of the logical data volume newly created by allocating the chunks in the chunk pool.

9. The storage apparatus according to claim 1, wherein
the second storage unit
is constituted as an embedded storage device incorporated into the storage apparatus, and
the controller
presents the second storage unit to the higher-level apparatus as the logical data volume included in the storage apparatus, and under the circumstance, adds the storage extent in the second storage unit to the chunk pool as the chunks.

10. A computer system comprising:
the storage apparatus according to claim 2; and
a management computer that manages operation of the storage apparatus, wherein
the management computer
holds an external arrangement possibility flag that designates whether to permit the external storage device to hold a virtual disk image constituting a virtual storage extent of a virtual computer, and
the controller
adds a storage extent storing the virtual disk image to the chunk pool as the chunks to migrate the storage extent from the external storage device to the first storage unit when the external storage device designated by the external arrangement possibility flag indicative of the prohibition of holding the virtual disk image holds the virtual disk image.

11. The computer system according to claim 10, wherein
the management computer
holds a required performance parameter that designates a required performance of the virtual storage extent or of each partial area of the virtual storage extent, and
the controller
allocates the chunks in the pool volume that satisfies the required performance designated by the required performance parameter as the chunks that store the virtual disk image.

12. The computer system according to claim 10, wherein
when the controller migrates part of the chunks constituting the virtual storage extent to another pool volume, the controller also migrates the other chunks constituting the virtual storage extent to the same pool volume.

13. The computer system according to claim 10, wherein
the management computer
holds dependency relationship information defining a dependency relationship between the plurality of virtual computers, when the controller migrates the chunks constituting the virtual storage extent used by the virtual computer to another pool volume, the controller specifies another virtual computer that depends on the virtual computer in accordance with the dependency relationship information, and the controller migrates the virtual storage extent used by the specified virtual computer to the same pool volume.

14. The computer system according to claim 13, wherein the dependency relationship information defines the virtual computers that operate independently from each other, when the controller migrates the chunks constituting the virtual storage extent used by the virtual computer to another pool volume, the controller specifies the other virtual computer that operates independently from the virtual computer in accordance with the dependency relationship information, and the controller migrates the virtual storage extent used by the specified virtual computer to a different pool volume.

15. A method of migrating data in a storage apparatus comprising:

first and second storage units that store data; and a controller that reads and writes data to and from the first and second storage units, the data migration method comprising:

a step of constituting pool volumes including one or more chunks as aggregations of data blocks in the first storage unit;

a step of consolidating chunks that can be dynamically allocated to other pool volumes among the chunks in the pool volumes to constitute a chunk pool as a set of the chunks;

a step of using the chunks in the chunk pool to create a logical data volume to provide the logical data volume to a higher-level apparatus; and a step of adding a storage extent in the second storage unit to the chunk pool as the chunks to dynamically allocate the chunks in the chunk pool to the newly created logical data volume to migrate data in the second storage unit to the first storage unit.

* * * * *